(12) United States Patent
Nebrigic et al.

(10) Patent No.: US 6,370,046 B1
(45) Date of Patent: Apr. 9, 2002

(54) ULTRA-CAPACITOR BASED DYNAMICALLY REGULATED CHARGE PUMP POWER CONVERTER

(75) Inventors: Dragan Danilo Nebrigic, Indian Springs; Milan Marcel Jevtitch; Vladimir Gartstein, both of Cincinnati, all of OH (US); William Thomas Milam, Knoxville, TN (US); James Vig Sherrill, Norris, TN (US); Nicholas Busko; Peter Hansen, both of Knoxville, TN (US)

(73) Assignee: The Board of Trustees of the University of Illinois

( * ) Notice: Subject to any disclaimer, the term of this patent is extended or adjusted under 35 U.S.C. 154(b) by 0 days.

(21) Appl. No.: 09/652,847

(22) Filed: Aug. 31, 2000

(51) Int. Cl.[7] .............................. H02M 3/18; G05F 1/10
(52) U.S. Cl. ............................ 363/60; 363/59; 327/536
(58) Field of Search ............................. 363/60, 59, 56, 363/55, 52; 327/536, 537, 589, 590

(56) References Cited

U.S. PATENT DOCUMENTS

| | | | |
|---|---|---|---|
| 3,811,648 A | 5/1974 | Ream, Jr. et al. ............ 250/578 |
| 3,896,320 A | 7/1975 | Moffatt ......................... 310/64 |
| 4,281,281 A | 7/1981 | Pungas et al. ............... 323/271 |
| 4,465,967 A | 8/1984 | Tokunaga et al. ........... 323/285 |
| 4,507,533 A | 3/1985 | Inoue ........................... 219/69 |
| 4,785,812 A | 11/1988 | Pihl et al. .................... 128/419 |
| 4,870,341 A | 9/1989 | Pihl et al. ...................... 324/57 |
| 4,870,369 A | 9/1989 | Bartenstein et al. .......... 330/59 |
| 5,132,895 A | * 7/1992 | Kase ............................ 363/60 |
| 5,202,594 A | 4/1993 | Chang ......................... 307/475 |
| 5,337,284 A | 8/1994 | Cordoba et al. ............. 365/227 |
| 5,347,172 A | 9/1994 | Cordoba et al. ......... 307/296.2 |
| 5,392,205 A | 2/1995 | Zavaleta ...................... 363/59 |
| 5,409,701 A | 4/1995 | Hatanaka et al. ............ 435/118 |
| 5,434,498 A | 7/1995 | Cordoba et al. ............. 323/313 |
| 5,483,152 A | 1/1996 | Hardee et al. ............... 323/314 |
| 5,532,915 A | 7/1996 | Pantelakis et al. ............ 363/60 |
| 5,570,005 A | 10/1996 | Hardee et al. ............... 323/314 |
| 5,591,209 A | 1/1997 | Kroll ............................. 607/5 |
| 5,596,532 A | 1/1997 | Cernea et al. ......... 365/185.18 |
| 5,627,739 A | 5/1997 | Yung-Chow et al. ......... 363/60 |
| 5,654,628 A | 8/1997 | Feldtkeller .................. 323/282 |
| 5,680,300 A | * 10/1997 | Szepesi et al. ................ 363/59 |
| 5,684,683 A | 11/1997 | Divan et al. ................... 33/65 |
| 5,694,308 A | 12/1997 | Cave ............................ 363/59 |
| 5,773,955 A | 6/1998 | Hall ............................ 320/21 |
| 5,815,356 A | 9/1998 | Rodriguez et al. .......... 361/91 |
| 5,889,428 A | 3/1999 | Young ......................... 327/536 |
| 6,208,196 B1 | * 3/2001 | St. Pierre ................... 327/536 |

FOREIGN PATENT DOCUMENTS

EP    0 596 228 B1    8/1997

\* cited by examiner

*Primary Examiner*—Rajnikant B. Patel
(74) *Attorney, Agent, or Firm*—Welsh & Katz, Ltd.

(57) ABSTRACT

A charge pump power converter efficiently provides electrical power by dynamically controlling a switch matrix of the charge pump that includes a flying ultra-capacitor $C^U_F$. Instead of open-loop oscillator-based control, a dynamic controller provides power upon demand by sensing the output voltage and changing the operating frequency of the charge pump in response. Moreover, this closed-loop dynamic control intrinsically voltage regulates the output voltage of the charge pump power converter without the inefficient addition of a step-down voltage regulator, downstream of the power converter. In addition, this closed-loop dynamic control allows for maintaining a desired output voltage even with variations in the input voltage. Further efficiency is achieved by controlling the charging and discharging of the flying ultra-capacitor $C^U_F$, both in rate of current change and in voltage ripple.

14 Claims, 12 Drawing Sheets

ULTRA-CAPACITOR BASED DYNAMICALLY REGULATED CHARGE PUMP POWER CONVERTER

CROSS REFERENCE TO RELATED APPLICATIONS

This application is also related to the following co-pending and commonly owned application which was filed on even date herewith by Dragan D. Nebrigic, et al.: U.S. Ser. No. 09/652,849 entitled "MULTIPLE OUTPUT DYNAMICALLY REGULATED CHARGE PUMP POWER CONVERTER" and which is hereby incorporated by reference herein in its entirety.

This application is also related to, and claims the benefit of, the following pending and commonly owned application filed on Mar. 22, 2000 by Dragan D. Nebrigic, et al.: U.S. Ser. No. 09/532,918 entitled "DYNAMICALLY CONTROLLED, INTRINSICALLY REGULATED CHARGE PUMP POWER CONVERTER" and which is hereby incorporated by reference herein in its entirety.

FIELD OF THE INVENTION

The present invention relates to DC/DC power supply controllers, and more particularly to regulated charge pump power converters for integrated power management systems.

BACKGROUND

Advances in electronics technology have enabled the design and cost-effective fabrication of portable electronic devices. Thus, usage of portable electronic devices continues to increase both in the number of products available and the types of products. Examples of the broad spectrum of portable is electronic devices include pagers, cellular telephones, music players, calculators, laptop computers, and personal digital assistants, as well as others.

The electronics in a portable electronic device generally require direct current (DC) electrical power. Typically, one or more batteries are used as an energy source to provide this DC electrical power. Ideally, the energy source would be perfectly matched to the energy requirements of the portable electronic device. However, most often the voltage and current from the batteries is unsuitable for directly powering the electronics of the portable electronic device. For example, the voltage level from the batteries may differ from the voltage level required by the device. In addition, some portions of the electronics may operate at a different voltage level than other portions, requiring different energy source voltage levels. Also, batteries are unable to respond quickly to rapid fluctuations in current demand.

The typical arrangement is shown in FIG. 1 for a portable electronic device 10 that includes an energy source 12, such as the one or more batteries, and a load device 14, such as the electronics that require electrical power. Interposed between the energy source 12 and the load device 14 is a power supply 16 that may perform a number of functions. For example, a power converter 20, depicted as integral to the power supply 16, provides the necessary changes to the power from the energy source 12 to make it suitable for load device 14.

The power supply 16 may also perform functions other than power conversion. For example, protecting the energy source 12, load device 14 and/or power converter 20 from damage by a sustained high electrical current may require electrically disconnecting the energy source 12 from the rest of the portable electronic device 10. As another example, the power converter 20 may require assistance during start-up.

Regarding the types of power conversion required, the power converter 20 may "step up" (i.e., boost) or "step down" the voltage. That is, the converter 20 may increase or decrease the output voltage $V_{OUT}$ provided to the load device 14 with respect to the input voltage Vs from the energy source 12. The power converter 20 may also store an amount of energy to satisfy a brief spike or increase in demand by the load device 14 that the energy source 12 is unable to provide.

The power converter 20 may also regulate the output voltage $V_{OUT}$, keeping it close to the desired output voltage level and reducing rapid fluctuations that may cause detrimental noise or cause undesirable performance of the load device 14. Such fluctuations may occur due to changes in demand, induced noise from external electromagnetic sources, characteristics of the energy source 12, and/or noise from other components in the power supply 16.

Although power converters 20 provide many benefits, existing power converters 20 also place undesirable performance constraints on portable electronic devices 10. The specific attributes of generally known power converters 20 are discussed below along with the types of constraints generally encountered.

Many generally known power converters 20 are optimized for a specific energy source 12 and a specific load demand from the load device 14. The power converter 20 may not accommodate, or only accommodate inefficiently, variations in the voltage and current characteristics of the energy source 12 and/or the load device 14. For example, some types of power converters 20 cannot provide an output voltage $V_{OUT}$ that is higher than the input voltage $V_S$ and/or their efficiency is related to how close the input voltage $V_S$ is to the required output voltage $V_{OUT}$. In addition, some power converters 20 are incapable of providing medium power levels such as 0.5–1.0 W. Moreover, generally known power converters 20 have a design that will only operate within a narrow range of input voltages, output voltages and power capacities.

Additionally, as will be discussed below with regard to FIG. 2, some power converters 20 achieve an acceptably regulated output voltage $V_{OUT}$ only through inefficient voltage regulators.

In other instances, voltage regulation by the power converter 20 is inadequate for the needs of the load device 14. For example, the nominal output voltage $V_{OUT}$ may vary due to variations in the input voltage $V_S$, variations in the temperature of the power converter or the output current drawn by the load device 14. Also, even if $V_{OUT}$ is at an acceptable nominal output level, the power converter 20 may undesirably oscillate about the nominal output voltage $V_{OUT}$. This voltage ripple $V_{RIP}$ is defined as the range of the oscillations about the nominal output voltage $V_{OUT}$ and may impair or preclude proper operation of the load device 14.

Therefore, existing power converters 20 do not efficiently provide on demand the required power to a load device, nor adjust to variations in the energy source and load device to provide a stable $V_{OUT}$.

Furthermore, existing power converters 20 do not operate with low input voltage levels, such as a sub-one volt input voltage $V_S$. The existing power converters 20 usually require an operational bias voltage that is typically comparable to the output voltage demands of the load device 14, which are generally greater than one volt. Also, a certain amount of noise is superimposed on the input voltage $V_S$ by external and internal sources. When the input voltage level $V_S$ is low, this noise may become relatively significant, degrading or precluding operation of the power converter 20.

One implication of requiring an input voltage of greater than one volt is that an otherwise desirable single cell battery, or an alternative source of power, may be inappropriate as an energy source 12 for the device 10. For example, the nominal voltage supplied by certain electrochemical batteries or alternative sources of power may be below one volt, or have a voltage characteristic that decreases as their stored charge decreases. Such batteries have a significant amount, and perhaps a majority of, their stored energy, which is retrievable only at a sub-one volt level. Consequently, the service life of the battery in a portable electronic device 10 is limited by the inability of the device to operate with a sub-one volt input voltage $V_S$ from the battery. As a result, batteries are discarded with a significant amount of charge or "life" still left in them. Achieving additional service life by incorporating additional batteries into the device 10 increases the size and weight of the device 10.

Therefore, many existing power converters do not operate (or operate desirably) with a sub-one volt input voltage.

Furthermore, even if a power converter 20 can continuously operate at a sub-one volt input voltage $V_S$, generally a higher input voltage level (i.e. over 1 volt) is required to start the power converter 20. That is, the converter requires a higher input voltage at the start-up phase than is necessary for continuous operation (e.g., 0.4 V higher). Therefore, the power converter 20 must be continuously operated once the minimum start-up input voltage is reached, thus consuming power, in order to enhance the amount of energy that is retrieved from the energy source 12.

For the start-up phase, an external start-up circuit (such as a Schottky diode) is often added to the existing power converters 20. The start-up circuit assists in overcoming the additional input voltage requirement at start-up and in shortening the period of time required for the power converter 20 to reach its designed output voltage. However, generally known start-up circuits are usually not capable of operating at sub-one volt input voltage. Also, having to use an external start-up circuit limits the ability to miniaturize the power converter 20. In addition, external start-up circuits tend to dissipate power even when the power converter 20 is not in a start-up condition, thereby reducing the efficiency of the power converter 20.

Therefore, existing power converters 20 are generally incapable of starting with a sub-one volt input voltage, nor efficiently provide for start-up with a greater than one volt input voltage.

Another drawback to the existing power converters 20 is that they cannot efficiently provide the output voltage required with sub-micron integrated circuits. Integrated circuit design in portable electronic devices 10 is moving toward circuits with lower operating voltages. For example, current fabrication capabilities for Complementary Metal Oxide Semiconductor (CMOS) based on sub-micron technologies (0.5 $\mu$m and less) typically provide for devices that operate at 3.0–3.3 V. The projected technology development for reducing the feature size of such integrated circuits will mean further reducing this operating voltage, and thus power supplies and power converters will have to be developed for providing these reduced operating voltages.

For example, trends in microprocessor design highlight the need and the advantages of power supplies that operate at the lower operating voltages. The feature size of the integrated circuit components of a microprocessor is reduced to increase functionality at a reduced cost. Thus, one chip may contain the circuitry of a number of chips and discrete components. Smaller feature size also allows for the microprocessor to perform its functions more quickly. With smaller features, digital switching may be performed more quickly. Since switched components tend to generate heat in proportion to the rate in which they are switched, more densely packed and more quickly switched components make heat dissipation a limiting constraint on the design of the microprocessor. The increased switching also means that each feature may act as a Radio Frequency (RF) antenna, emitting Electromagnetic Interference (EMI) to adjacent features. Reducing the operating voltage of the microprocessor accommodates the reduction in feature size, the increased switching and the heat dissipation. Still further, as mentioned, the heat generated by the features is typically proportional to the operating frequency; however, the heat generated is also quadratically related to the operating voltage, that is, reducing the operating voltage by half reduces the heat generated to a quarter. Thus, the resultant trend in lower operating voltage can be seen by typical microprocessors using 5 V in 1990, 3.3 V in 1995, 1.8–2.4 V in 1998, 1.2–2.4 V in 2000, and 1 V or less expected thereafter.

As the feature size becomes smaller, the current carrying capability of each feature is also reduced. Consequently, a lower operating voltage provides for reducing this current so that the feature does not fail.

Still further, the distance between features is reduced, and thus the amount of insulating material between the features is reduced. Consequently, a lower operating voltage avoids a breakdown through the thinner insulating material between features that would cause microprocessor failure.

Therefore, a significant need exists for a power converter that may provide an output voltage $V_{OUT}$ that addresses the lower operating voltages required by smaller and faster integrated circuits and microprocessors. More particularly, it is desirable that the power converter may advantageously generate regulated output voltage $V_{OUT}$ in the range of 0.8–1.6V.

Still another drawback to existing power converters 20 is that they are not suitable for the desired level of miniaturization in portable devices and are not appropriate for embedded applications, even considering integrated circuit structures such as Silicon On Insulator (SOI) and Silicon On Metal (SOM). In some instances, miniaturization is not possible due to the number of discrete external components necessary that are not amenable to integrated circuit fabrication. These components thus require a printed circuit board (PCB), hybrid or multi-chip module (MCM) design wherein the size and expense of such fabrication is higher than for an entirely integrated circuit.

In addition, the efficiency of generally known power converters 20 results in an amount of heat generation that is not suitable for further miniaturization.

Therefore, existing power converters 20 cannot be fabricated as an integrated circuit, especially embedded with a load device 14.

Another drawback to conventional power converters is that they may emit undesirable amounts of electromagnetic interference (EMI) that must be controlled by distancing and/or shielding the load device 14. The EMI may be from an inductor incorporated into the power converter 20, or the result of reducing the feature size of the circuits in the power converter 20. When seeking to reduce the size of discrete components through use of smaller components, the energy storage and transfer capability is necessarily also reduced. Therefore, a higher operating frequency is required to transfer an equivalent amount of power. However, the higher operating frequency also results in EMI that is detrimental to the portable electronic device 10. Moreover, the portable electronic device 10 itself generally has federally mandated limits on RF emissions that may be exceeded by a sufficiently high operating frequency.

Therefore, it is also desirable that the power converter 20 should advantageously generate minimal amounts of heat or radiated energy (EMI) to the load device 14, and thus be suitable for being embedded on the same integrated circuit or module.

Therefore, various of the existing types of power converters 20 are inappropriate for addressing one or more of the drawbacks noted above and for satisfying needs in the industry and market place. As such, it is desirable to improve upon the power converter technology to address various of the drawback noted above.

SUMMARY

The invention overcomes the above-noted and other deficiencies of the prior art by providing an apparatus and method for a dynamically controlled, intrinsically regulated power converter that efficiently transfers power from an energy source as demanded by a load device.

In particular, in one aspect consistent with the invention, a dynamic controller operates a capacitive power output stage to pump charge at a rate to maintain an output voltage $V_{OUT}$ across a load capacitor $C_L$. More particularly, the dynamic controller discharges a fly capacitor $C_F$ into the load capacitor $C_L$ when the output voltage $V_{OUT}$ drops below a reference voltage $V_{REF}$. Therefore, operating at a level corresponding to the demand of the load enhances the efficiency of the power converter. Furthermore, the output voltage $V_{OUT}$ is intrinsically regulated in that charge is transferred at a rate to maintain a predetermined voltage level. Therefore, an inefficient downstream voltage regulator is not needed.

In another aspect consistent with the invention, a power converter is operable with a sub-one volt input voltage $V_S$ by advantageously incorporating low control threshold switches in the dynamic controller and the capacitive power output stage.

In yet another aspect consistent with the invention, a power converter is operable with a sub-one volt input voltage from a discharged condition by utilizing a progressive startup switch that charges a startup capacitor when the dynamic controller is off. Once charged, the startup capacitor in turn closes a power switch in the output stage to provide charge to the load capacitor $C_L$ until the load capacitor $C_L$ is sufficiently charged for the dynamic controller to assume control of the power output stage.

In yet a further aspect consistent with the invention, a power converter provides a predetermined output voltage, either increased or decreased (stepped up or down) with respect to the input voltage. The power converter may flexibly provide an output voltage with intrinsic regulation insensitive to factors such as the input voltage and temperature so that a predetermined low output voltages, for example 0.8–1.6 V or lower, are efficiently provided.

In yet an additional aspect consistent with the invention, an integrated power converter provides efficient and regulated power conversation, and thus generates little heat. In particular, the integrated power converter has inherently low EMI emission by being capacitance only, without an inductor. Furthermore, the integrated power converter mitigates EMI emissions during low capacity demand by switching more slowly. The lack of an inductor enables some applications to be further miniaturized by having no external components by incorporating integrated circuit capacitors. For these reasons, in some applications the integrated power converter may advantageously be embedded in an integrated circuit with a load device. In addition, in some applications the integrated power converter is adapted for low input and/or low output voltage.

In yet a further aspect consistent with the invention, a power converter utilizes a two-state controller that switches a flying ultra-capacitor at a limited voltage change rate (slew rate) to produce increased output power. The two-state controller maintains a predetermined voltage ripple across the flying ultra-capacitor to achieve efficient charge transfer to the output capacitor.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF INVENTION

Power Conversion

Figure 1:
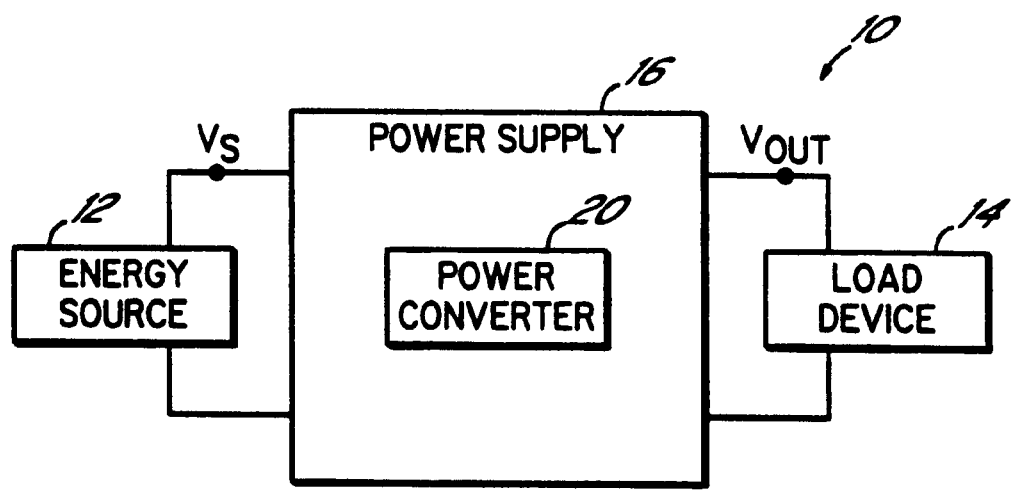
FIG. 1 is a top-level block diagram of a portable electronic device incorporating a power supply with a power converter.

The operation and advantages of dynamic control of a charge pump in accordance with the principles of the invention is best understood by considering alternative power conversion techniques in existing power converters.

For example, a linear regulator is one type of existing power converter. Linear regulators have an efficiency that is directly proportional to the ratio of the input voltage $V_S$ to the output voltage $V_{OUT}$. Thus, an input voltage $V_S$ that is twice the required output voltage $V_{OUT}$ would result in about half of the power from an energy source 12 being inefficiently consumed by the power converter 20. Due to the lower efficiency and resulting heat generation, linear regulators require a heat sink that often complicates or precludes integration into low profile packages such as those complying with the PCMCIA specification standard. Moreover, linear regulators generally require two discrete capacitors, further limiting reductions in size. Furthermore, linear regulators cannot step-up the input voltage $V_S$ and thus are inappropriate for certain applications. For example, a small portable electronic device 10 such as a hearing aid may benefit from an inexpensive, single-cell alkaline battery that provides a voltage of 0.8–1.4 V. However, the load device 14, in this case the electronics of the hearing aid, may require 3.0 V. Linear regulators are unsuitable for such an application.

Inductor-based power converters and capacitance-only ("charge pump") power converters are each capable of stepping up or stepping down an input voltage $V_S$. Such designs generally require 1.5–3.3 V input voltage $V_S$ and provide an output voltage $V_{OUT}$ from 1.8–5.0 V, with the delivered current between 10–200 mA continuous. With these designs, sub-one volt input voltages or output voltages are generally not possible. Moreover, output power in the 200–500 mW range are also generally not available, except through approaches such as placing multiple power converters 20 in parallel to combine their respective outputs, and thus the power consumed by the combination increases.

Inductor-based power converters are typically chosen over capacitance-only charge pump power converters for low power applications (e.g., up to 200 mW) since they are relatively efficient compared to a charge pump design. Also, the desired output voltage $V_{OUT}$ is easier to achieve than with charge pumps. Specifically, the output voltage $V_{OUT}$ is proportional to the inductance value of the inductor multiplied by the derivative of the electrical current (di/dt). Consequently, higher operating frequency and/or higher electrical current levels at the input generally do not directly affect the achieved output voltage. However, inductor-based power converters generally require a non-linear ferrite coil or ferrite bead for the inductor, and also require external resistors and capacitors. Thus, inductor-based power converters are not readily further miniaturized. The inductor is also a "noisy" component that generates undesirable EMI.

Figure 2:
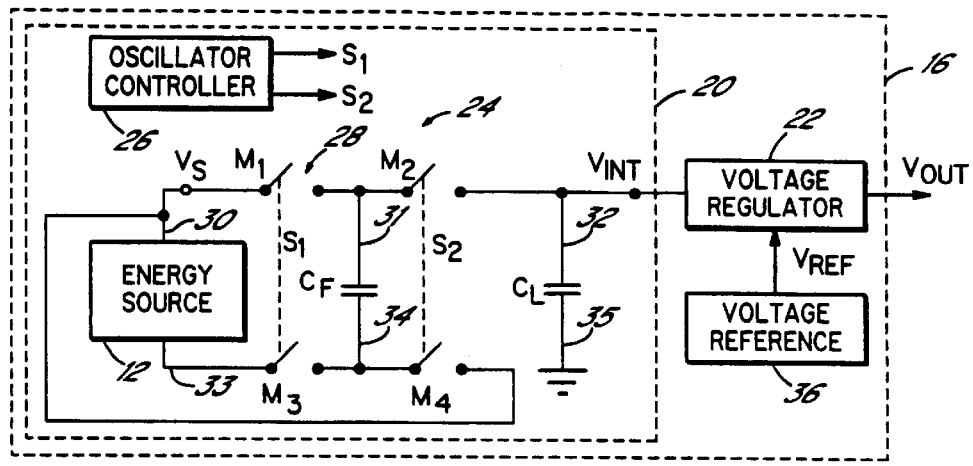
FIG. 2 is a top-level block diagram of an oscillator-controlled power converter (open-loop charge pump).

With reference to FIG. 2, one generally known capacitance-only power supply 16, is shown incorporating an oscillator-controlled power converter 20 (or "open loop charge pump") and a downstream voltage regulator 22. The energy source 12, such as a battery, is shown as part of supply 16 for illustrative purposes. Such a design does have an advantage of avoiding the integration problems and EMI problems of using an inductor.

Open-loop control indicates that the oscillator-controlled power converter 20 does not advantageously use feedback to help adjust its output. Dynamic (or closed-loop) control by contrast is generally used when improved control is needed. For example, cooking by timing is an open-loop control method, requiring periodic checks to avoid under cooking or over cooking. Thus, cooking with a temperature probe is an example of dynamic, closed-loop control, insuring that the food reaches the desired temperature, even with variations in weight of the food or in the cooking energy (e.g., oven heat or microwave energy).

However, open-loop charge pumps 20 are inefficient and do not provide output currents above 200 mA except by adding together multiple charge pumps in parallel to achieve the desired output current. The result, although capable of providing increased current, is inefficient. This requirement of cascading multiple charge pumps is a result of the power switches M1–M4 used that act as series resistors ("parasitic resistance") when on. At high input current levels, the resulting parasitic resistance makes for very inefficient operation since the power consumed by the circuit is a function of the square of the input current multiplied by the parasitic resistance of the switches. Thus, generally achieved efficiencies are in the range of 30–90%, with the higher efficiencies achieved when the charge pump is operating at its designed maximum capacity to service a maximum demand by the load device. At lower demand levels, the charge pump further incurs power losses when switching between states unnecessarily.

In addition, another disadvantage of oscillator-based power converters 20 is that most require about three external capacitors, which prevents integration and miniaturization of the circuit.

The power converter 20 of FIG. 2 (or "open-loop charge pump") includes an output stage 24 and an oscillator controller 26. The basic principle upon which the open loop charge pump 20 is based is the alternating of the output stage 24 between a charge phase and discharge (or pump) phase in response to the oscillator controller 26. The timing of the switching between the phases is predetermined and typically based on the anticipated peak demand at the load device.

Types of power output stages 24 include inverting and noninverting versions as well as those with various numbers of capacitive components for transferring and storing electrical charge. A noninverting output stage 24 is depicted in FIG. 2 with a switch matrix 28, one fly capacitor $C_F$, and one load (or storage) capacitor $C_L$. The switch matrix 28 may be an integrated circuit whereas generally known fly and load capacitors $C_F$, $C_L$ are discrete components. The switch matrix 28, responsive to the oscillator controller 26, couples the energy source 12, fly capacitor $C_F$ and load capacitor $C_L$ into the charge configuration and the discharge configuration.

Specifically, the switch matrix 28 includes four power switches M1–M4. The first power switch M1 closes in response to a charge switch signal S1 from the oscillator controller 26, electrically coupling a positive terminal 30 (input voltage $V_S$) of the energy source 12 to a first terminal 31 of the fly capacitor $C_F$. The second power switch M2 closes in response to a discharge switch signal S2 from the oscillator controller 26, electrically coupling the first terminal 31 of the fly capacitor $C_F$ to a first terminal 32 ($V_{INT}$) of the load capacitor $C_L$. A third power switch M3 closes in response to the charge switch signal S1, electrically coupling a reference terminal 33 of the energy source 12 to a second terminal 34 of the fly capacitor $C_F$. The fourth power switch M4 closes in response to the discharge switch signal S2, electrically coupling the second terminal 34 of the fly capacitor $C_F$ to the positive terminal 30 of the energy source 12.

In operation, the oscillator controller 26 turns on the charge switch signal S1 closing the first and third power switches M1, M3, while turning off the discharge switch signal S2 opening the second and fourth power switches M2, M4. Thus, the load capacitor $C_L$ provides the unregulated output voltage, (or intermediate voltage $V_{INT}$) and is electrically disconnected from the fly capacitor $C_F$ and the energy source 12. Also, the fly capacitor $C_F$ is electrically placed in parallel to the energy source 12 and is thus charged to a fly capacitor voltage that is less than or equal to the input voltage $V_S$ of the energy source 12. The amount of charge transferred to the fly capacitor $C_F$ will depend on several factors including whether the fly capacitor $C_F$ was fully discharged, the amount of time the oscillator controller 26 leaves the fly capacitor $C_F$ in the charge configuration, the electrical characteristics of the fly capacitor $C_F$, and the input voltage $V_S$. For simplicity, it will be assumed that the fly capacitor $C_F$ achieves a full charge and thus the fly capacitor voltage $V_F$ is equal to $V_S$ at the end of the charge phase.

The oscillator controller 26 will then switch at a predetermined time to a discharge configuration by turning off charge switch signal S1, opening the first and third power switches M1, M3, and turning on discharge switch signal S2, closing the second and fourth power switches M2, M4. Thus, the fly capacitor voltage $V_F$ (here assumed to be $V_S$) is added to the input voltage $V_S$ of the energy source 12 by placing the fly capacitor $C_F$ in additive electrical series with the energy source 12. The combination is electrically coupled across the load capacitor $C_L$. Thus, during the discharge phase, the intermediate voltage $V_{INT}$ at the first terminal 31 of the load capacitor $C_L$ is charged to approach approximately twice the input voltage $V_S$.

Again, the amount of charge transferred to the load capacitor $C_L$ will depend on a number of factors such as the predetermined duration of the discharge phase, the electrical characteristics of the load capacitor $C_L$, the amount of charge in the fly capacitor $C_F$ and load capacitor $C_L$ at the beginning of the discharge phase, the input voltage $V_S$, and the amount of power being drawn from the load capacitor $C_L$ by a load device 14 at $V_{OUT}$.

Consequently, the actual intermediate voltage $V_{INT}$ is typically 1.6 to 1.9 times the input voltage $V_S$ for each fly capacitor $C_F$. Achieving greater increases requires multiple fly capacitors $C_F$, each electrically coupled in parallel with the energy source 12 during the charge phase and all electrically coupled in series with the energy source during discharge phase. Thus, the resulting achievable intermediate voltage $V_{INT}$ is disadvantageously limited to certain ranges predetermined by the input voltage $V_S$ and the number of fly capacitors $C_F$.

The downstream voltage regulator 22 is made necessary to limit, typically by stepping down, the unregulated intermediate voltage $V_{INT}$ from the oscillator-based power converter 20 to the desired regulated output voltage $V_{OUT}$. Typically, the voltage regulator 22 compares the unregulated intermediate voltage $V_{INT}$ to a reference voltage $V_{REF}$ from a voltage reference 38 to determine the output $V_{OUT}$. The voltage regulator 22 is downstream in that it is functionally separate and subsequent to the oscillator-controlled power converter 20, rather than integral aspect of the power converter 20.

Consequently, the capacitance-only power supply 16 consumes electrical energy from the switching of the switch matrix 28, the constantly operating oscillator controller 26, as well as the power consumed by the voltage regulator 22. The power consumption by the voltage regulator 22 is especially disadvantageous when using the prior art capacitance-only power supply 16 to step down (decrease) the output voltage $V_{OUT}$ with respect to the input voltage $V_S$. The oscillator-based power converter 20 only steps up the input voltage $V_S$. Consequently, the voltage regulator 22, in stepping down the intermediate voltage $V_{INT}$, consumes more power.

Dynamic Control in a Power Converter

Figure 3:
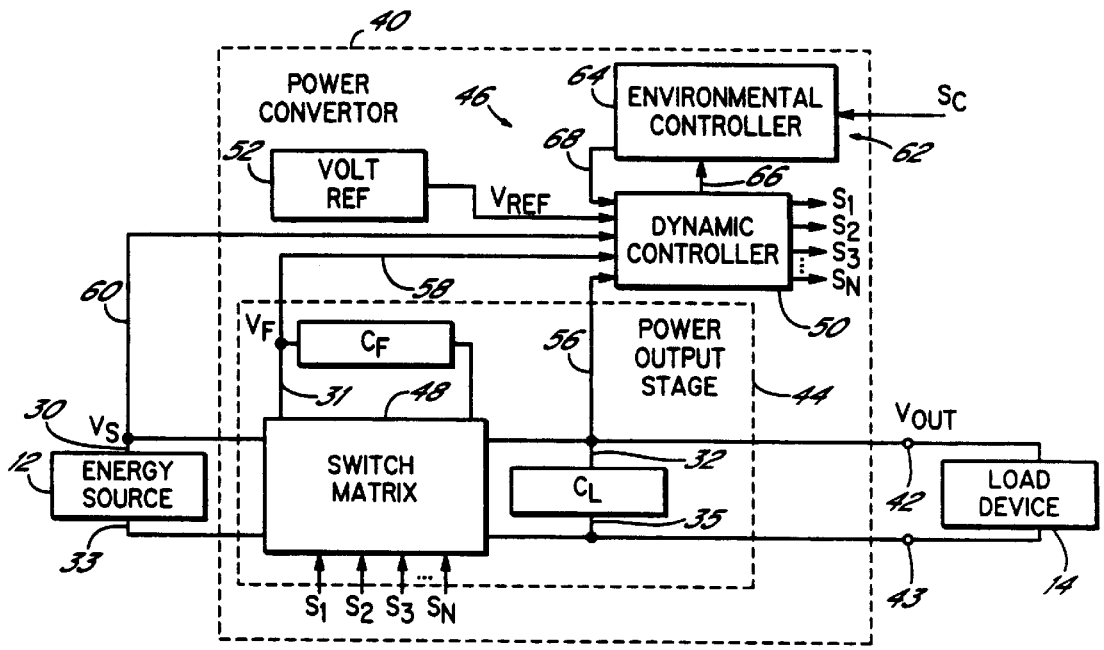
FIG. 3 is a top-level block diagram of a dynamically controlled, intrinsically regulated power converter.

In reference to existing power converter 20 discussed above, one embodiment of the invention is now described. Referring to FIG. 3, a power converter 40 is depicted in block diagram form, illustrating dynamic control of power transfer from an energy source 12 to a load device 14 coupled to the output voltage $V_{OUT}$ across output terminals 42, 43 in accordance with one aspect of the invention. The power converter 40 is dynamically controlled in that it adapts to the demands from the load device 14, even with variations in the input voltage $V_S$, and the transfer and storage characteristics of the power converter 40.

The power converter 40 is intrinsically voltage regulated in that the amount of charge transferred does not only correspond to the demand, but the rate of charge transfer is controlled so that the output voltage $V_{OUT}$ remains within an accepted range. This is generally referred to as remaining within an acceptable voltage ripple $V_{RIP}$. Thus, the regulation is not performed at a later stage, thereby eliminating the added complexity and power consumption of a typical separate voltage regulator 22, as discussed with regard to FIG. 2.

The power converter 40 includes a power output stage 44 that transfers the charge to the load device 14 and a power controller 46 coupled to the power output stage 44 to responsively command the appropriate amount of charge to be transferred.

In one embodiment, the power output stage 44 is a capacitive charge pump, incorporating a load capacitor $C_L$ across the output terminals 42, 43. The load capacitor $C_L$ stores electrical charge and provides the output voltage $V_{OUT}$ in relation to its stored charge. The power output stage 44 also incorporates a fly capacitor $C_F$ for transferring charge from the energy source 12 to the load capacitor $C_L$. Capacitors for the load capacitor $C_L$ and fly capacitor $C_F$ may advantageously be chosen for low internal resistance so that the power converter 40 may have reduced power consumption. The power output stage 44 includes a switch matrix 48 coupled to the fly capacitor $C_F$, load capacitor $C_L$, and energy source 12 for configuring the power output stage 44 between a charge phase and a discharge (or pump) phase, as is common with charge pumps. More particularly, during the charge phase, the switch matrix 48 is adapted to couple the fly capacitor $C_F$ in parallel electrically to the energy source 12 to charge the fly capacitor $C_F$. Also during the charge phase, the load capacitor $C_L$ provides power to the load device 14 and is electrically uncoupled from the energy source 12 and the fly capacitor $C_F$.

During the discharge phase, the switch matrix 48 is adapted to discharge the "stacked up" voltages of the energy source 12 and fly capacitor $C_F$ placed into electrical series with the load capacitor $C_L$ as discussed above. Thus, the power output stage 44 may charge the load capacitor to an output voltage $V_{OUT}$ higher than the input voltage $V_S$ of the energy source 12.

It will be appreciated that in some applications the power output stage 44 is capable of stepping down (decreasing) the input voltage $V_S$ with the same configuration as shown in FIG. 3. The switch matrix 48 may be switched so that only the fly capacitor $C_F$ alone with its fly capacitor voltage $V_F$ is coupled across the load capacitor $C_L$ during the discharge phase. Typically the fly capacitor $C_F$ has a smaller storage capacity than the load capacitor. Thus, each discharge phase is insufficient alone to overcharge the load capacitor, especially given the dynamic control to be discussed in more detail below. By contrast, conventional power converters 20 are configured in advance for stepping up the output voltage by configuring the fly capacitor $C_F$ and energy source 12 to couple in series during the discharge phase. Altering the configuration in advance to step down with only the fly capacitor $C_F$ coupling during the discharge phase fails to achieve the flexibility of having a dynamic controller 50 capable of reconfiguring as needed to achieve the desired output voltage $V_{OUT}$.

Therefore, since the power converter 40 is capable of stepping down the input voltage as well as stepping up (increasing) the input voltage, the inefficient downstream voltage regulator 22, described above in the oscillator-controlled power converter 20 in FIG. 2, is not required.

In addition, the power output stage 44 may be inverting or noninverting, with respect to whether the output voltage has an opposite algebraic sign to the input voltage $V_S$. For example, a 2.2 V input voltage $V_S$ may be converted to a −1.6 V output voltage $V_{OUT}$. Generally, noninverting embodiments are illustrated below for clarity, although one skilled in the art, having the benefit of the instant disclosure, should recognize application to inverting power converters 40.

Multi-loop power controller 46 comprises a dynamic controller 50, a voltage reference 52, and an environmental controller 64 to advantageously control the power output stage 44. A first control loop 56 is formed by the output voltage $V_{OUT}$ from output terminal 42 being provided as feedback to the dynamic controller 50. The dynamic controller 50 commands the switch matrix 48 to transfer additional charge from the energy source 12 to the load capacitor $C_L$ in response to the output voltage $V_{OUT}$ being below a predetermined value $V_{REF}$. The dynamic controller 50 makes the determination of whether $V_{OUT}$ is below a predetermined value in comparison to a reference voltage $V_{REF}$ from voltage reference 52. One suitable $V_{REF}$ may be provided by the energy source 12 if it is sufficiently voltage stable to simplify the voltage reference 52 (e.g., lithium batteries are voltage stable). Thus, the voltage reference 52 may then be provided by a voltage divider or multiplier of the input voltage $V_S$ to achieve the desired reference voltage $V_{REF}$.

For certain applications of the invention, the first control loop 56 alone is sufficient for dynamic control of the power transfer of the power converter 40 to achieve a regulated output voltage $V_{OUT}$.

In addition to the first control loop 56, the multi-loop power controller 46 may further include a second control loop 58. In the second control loop 58, the charge on the fly capacitor $C_F$ is sensed as a fly capacitor voltage $V_F$ by the dynamic controller 50. Thus, any discharge of the fly capacitor $C_F$ upon demand may be predicated upon the fly capacitor $C_F$ first reaching an optimum state of charge, approximately 80%. The optimum state of charge exists because undercharging the fly capacitor $C_F$ results in unnecessary switching losses and overcharging the fly capacitor $C_F$ unnecessarily limits the rate of power transfer.

Regarding unnecessary switches losses, dynamic control of the switch matrix 48 achieves efficiency in part as described with the first control loop by remaining in the discharge phase until more charge is needed (i.e., $V_{OUT}$ drops below $V_{REF}$). Oscillator-based charge pumps 20, by contrast, are switched at a fixed rate even when not necessary. Additional efficiency in the dynamic control of the switch matrix 48 is realized by remaining in the charge phase long enough for the fly capacitor $C_F$ to acquire a significant amount of charge. For example, charging to 40% rather than 80% of full charge would require that the operating frequency would double to transfer the same power. Power switches M1–M4 dissipate power in relation to this increased operating frequency. Consequently, the second control loop 58 senses the voltage level of the fly capacitor $C_F$ to avoid undercharging during the charge phase, and thus avoid unnecessary switching losses.

Optimizing the charge on the fly capacitor $C_F$ also includes avoiding overcharging. Capacitors are characterized by their rate of charging as a function of time. Specifically, as capacitors approach a fully charged condition, their rate for accepting additional charge decreases. Thus, the initial amount of charge acquired by the capacitor takes less time than a later similar amount of charge. For example, it would take less time to charge the fly capacitor $C_F$ twice to 45% than to charge the fly capacitor $C_F$ once to 90%, even though the same amount of charge would be accepted by the fly capacitor $C_F$. Consequently, leaving the switch matrix 48 in the charge phase for a period of time longer than required to achieve the optimum level of charge of the fly capacitor $C_F$ misses an opportunity to transfer more power.

It should be appreciated that the optimum level of charge may be determined empirically and/or analytically as would be apparent to those skilled in the art.

In combination with one or more other control loops 56, 58 discussed above, the power converter 40 may advantageously include a forward control loop 60 whereby one or more parameters of the energy source 12 are provided to the dynamic controller 50. One use of the forward control loop 60 would include disabling (i.e., interrupting output current to the output terminals 42, 43) and/or bypassing (i.e., directly coupling the energy source 12 to the output terminals 42, 43) the power converter 40 due to unsafe conditions or performance limiting conditions sensed in the energy source 12. For example, a low input voltage may indicate inadequate remaining charge in the energy source 12 to warrant continued operation of the power converter 40. As another example, the electrical current drawn from the energy source 12 may be too high or sustained operation. Thus, a protection circuit may be included in the power converter 40 for interrupting output current to the output terminals 42, 43 based upon control loop 60.

As yet an additional example, a large demand by the load device 14 may warrant continued operation of the power converter 40 in parallel to a direct coupling of the energy source 12 to the output terminals 42, 43. This may be especially true when the input voltage $V_S$ and desired output voltage $V_{OUT}$ are approximately the same. An increased output current $I_L$ is achievable by having two paths providing current to output terminals 42, 43.

As a further example, the fly capacitor voltage $V_F$ (second control loop 58), and the input voltage $V_S$ (forward control loop 60) may indicate that the power converter 40 is discharged and is in a start-up condition. This start-up condition may advantageously warrant use of a rapid progressive start-up circuit, an example being described below.

In combination with one of the other control loops 56, 58, and 60, the power controller 46 may further include an adaptive control loop 62, as represented by an environmental controller 64. The environmental controller 64 senses a control parameter 66 and provides a command 68 to the dynamic controller 50 for altering the predetermined value for the output voltage $V_{OUT}$. For example, the environmental controller 64 may sense that the dynamic controller 50 has become unstable, and in response thereto, may provide a signal to drive the dynamic controller 50 to a stable output condition. More particularly, the environmental controller 64 may be adapted to sense an unstable operating condition of the power converter 40, such as the instantaneous output voltage and current each approaching a constant value. The environmental controller 64 may then adjust the predetermined value to drive the power converter 40 to a stable operating condition. Moreover, such altering of the predetermined value may include resetting of the dynamic controller 50 to a stable initial condition.

As another example, the adaptive control loop 62 may include a control signal $S_C$ that is input to the environmental controller 64 whereby the dynamic controller 50 can be made to respond to changes in a load device 14 (e.g., CPU, volatile memory, analog-to-digital converter, digital-to-analog converter) or to other parameters. The load device 14 may advantageously perform better with an adjusted output voltage $V_{OUT}$ from the power converter 40. As another example, the output control signal $S_C$ may be a reconfiguration control signal, such as for selecting a desired inverting or noninverting mode or predetermined output voltage $V_{OUT}$. As yet another example, a protective function (e.g., bypassing, disabling, or altering the output voltages) may be dictated by the $S_C$ command to preclude damaging a load device 14. For example, the load device 14 may fail under high current, and thus, limits may be imposed to preclude this occurrence.

Depending upon the type of switch matrix 48 that is utilized in the invention, various control signals are generated by the dynamic controller 50 for the switch matrix 48, as represented by switch signals S1, S2, and S3 to $S_N$, as will be discussed in more detail below.

It should be appreciated that the fly capacitor $C_F$ and the load capacitor $C_L$ are illustrative of charge storage and transfer components and may represent discrete capacitors or integrated circuit capacitor arrays.

Moreover, due to the flexibility of the dynamic controller 50, the fly capacitor $C_F$ and load capacitor $C_L$ may include various levels of storage capability, such as with small capacitors (e.g., ceramic, chip thick film, tantalum, polymer) and large capacitors (e.g., ultra-capacitors, pseudo-capacitors, double-layer capacitors). The amount of capacitance is reflective of the amount of storage capability. Thus, providing the same amount of energy transfer requires either that small doses of charge be transferred from a small fly capacitor $C_F$ with a high operating frequency or that larger doses of charge be transferred more slowly. Thus, the power converter 40 is flexible in that the same dynamic controller 50 may control various power output stages 44, as will be discussed in more detail with regard to FIG. 5. In particular, unlike the prior art oscillator-controlled power converter 20, the dynamic controller 50 may operate in the low operating frequency range appropriate for power output stages 44 incorporating ultra-capacitors, as will be discussed.

It should further be appreciated that the energy source 12 may include various electrical charge storage or generating devices such as one or more electrochemical cells (e.g., a battery), photovoltaic cells, a direct-current (DC) generator (e.g., a wrist watch charged by a motion-powered generator in combination with a rechargeable battery), and other applicable power sources.

As another example, power converters 40 consistent with the invention may be used advantageously in electronic devices powered by other power supplies. For example, a device receiving its power from a standard alternating current (AC) wall plug generally transforms the AC power into direct current (DC) power for electronic portions of the device. The DC power provided may be unsuitable for all or portions of the electronics without further adjustment and regulation. For example, a microprocessor may be operating at 2.2 V whereas input/output electronics may operate at 5 V. Consequently, a power converter 40 in accordance with the invention may be used to step-down the input voltage to the microprocessor.

Capacitive Charge Pump Output Stage

Figure 4:
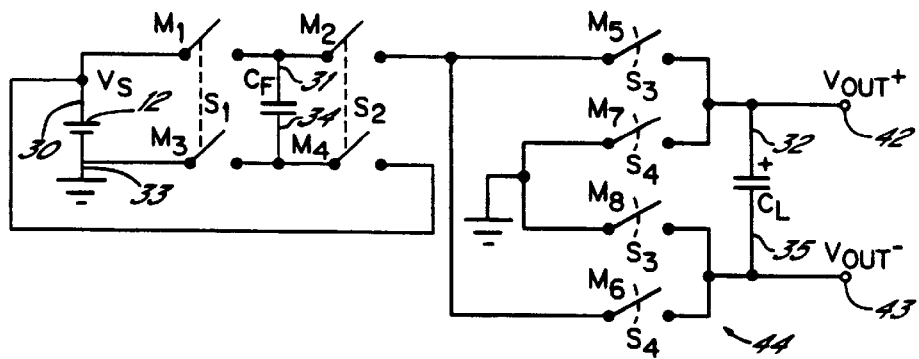
FIG. 4 is one embodiment of a circuit for a power output stage for the power converter of FIG. 3.

With reference to FIG. 4, one suitable charge pump power output stage 44 is shown for the embodiment of the invention illustrated as power converter 40 of FIG. 3. The power output stage 44 is configurable to be both inverting and noninverting. Four switches M1, M2, M3, M4 are used to switch the energy source 12, such as a DC source, and a suitable fly capacitor $C_F$ between a charge phase and a discharge phase with respect to a load capacitor $C_L$, as was described for FIG. 2. Specifically, switches M1 and M3 close in response to switch signal S1, whereby M1 couples the positive terminal 30 (input voltage $V_S$) of the energy source 12 to the first terminal 31 of the fly capacitor $C_F$ and M3 couples a second terminal 34 of the fly capacitor $C_F$ to ground. Switches M2 and M4 are open during the charge phase.

During the discharge phase, switch signal S1 is removed, opening switches M1 and M3. Then, the input voltage $V_S$ of the energy source 12 and the fly capacitor $C_F$ are placed into series arrangement by switches M2 and M4 closing in response to switch signal S2. Thus, the first terminal 31 of $C_F$ is available for coupling to the load capacitor $C_L$ via switch M2 and the second terminal 34 of the capacitor $C_F$ is coupled to the positive terminal 30 ($V_S$) of the energy source 12 via switch M4.

Reconfiguration switch signals S3 and S4 control in what sense the series combination of fly capacitor $C_F$ and energy source 12 are placed across load capacitor $C_L$ so that the power output stage 44 may be operated in either inverting or noninverting mode. A noninverting mode means that the output voltage $V_{OUT}$ is provided at the positive output terminal 42 ($V_{OUT}^+$) and negative output terminal 43 ($V_{OUT}^-$) is generally referenced to ground. An inverting mode means that the output voltage $V_{OUT}$ is provided at the negative output terminal 43 ($V_{OUT}^-$) and is of the opposite algebraic sign as the input voltage $V_S$ of the energy source 12. The positive output terminal 42 ($V_{OUT}^+$) is then generally referenced to ground. The (positive polarity) first terminal 32 of the load capacitor $C_L$ is electrically coupled to the positive output terminal 42 ($V_{OUT}^+$). The (negative polarity) second terminal 35 of the load capacitor $C_L$ is electrically coupled to the negative output terminal 43 ($V_{OUT}^-$).

Noninverting mode is performed with the power output stage 44 by closing reconfiguration switches M5 and M8 with signal S3 and opening reconfiguration switches M6 and M7 with signal S4. Overlap in the commands of signals S3 and S4 is avoided to prevent either switch M5 or M8 being closed simultaneously with either switch M6 or M7, to thereby prevent inadvertently shorting the load capacitor $C_L$. Thus, noninverting mode results in a first, (positive polarity) first terminal 32 of the load capacitor being coupled by the closing of switch M5 to the first terminal 31 of the fly capacitor $C_F$ via switch M2. The (negative-polarity) second terminal 35 of the load capacitor $C_L$ is referenced to by the closing of switch M8.

Inverting mode is performed with the power output stage 44 by opening reconfiguration switches M5 and M8 with signal S3 and closing reconfiguration switches M6 and M7 with signal S4. Thus, the load capacitor $C_L$, in addition to being coupled to the output terminals 42, 43 as before, has its first terminal 32 referenced to ground by the closing of switch M7, and thus positive output terminal 42 ($V_{OUT}^+$) is referenced to ground. The second terminal 35 of the load capacitor $C_L$ is coupled by the closing of switch M8 to the first terminal 31 of the fly capacitor $C_F$ via switch M2.

It should be appreciated that reconfiguring a power output stage 44 allows for one circuit to selectably provide both a noninverting or an inverting output voltage at the same output terminals 42, 43. Thus, a fully integrated linear power supply based on the reconfigurable power output stage 44 would allow replacing both 78XX (noninverting) and 79XX (inverting) microchips (e.g., packaged in TO-220, TO-3, SO8-TSOP-8, SOT23, SOT223, etc., types of packaging) with only one microchip. Replacing two types of devices with one advantageously allows for more economical manufacturing and simplifies inventory control.

In addition, the environmental controller 64 of the power converter 40 may automatically configure the power output stage 44 for the appropriate mode, inverting or noninverting, based on an external parameter $S_C$ or internal parameter 66. Thus, more flexibility is provided for a portable electronic device 10 during the design process or during operation by incorporating a power controller 46 readily reconfigured to the desired mode. For example, power controller 46, controlling the power output stage 44, may respond to sensed parameters such as the polarity of a discrete component load capacitor $C_L$ to initiate configuring switches M5–M8. Alternatively, reconfigurable switches M5–M8 may comprise pins of the microchip that may be externally closed.

It should further be appreciated that various other power output stages 44 consistent with the invention may be used. For example, two or more fly capacitors $C_F$ may be each charged in parallel to the energy source 12 and then additively placed in series to gain greater step-up voltage capability. In addition, a power converter 40 may further include a hybrid inverting and noninverting arrangement wherein one portion of the power converter 40 provides a dynamically-controlled, intrinsically voltage regulated positive output voltage, reference to ground, at the positive output terminal 42. Simultaneously, another portion of the power converter 40 provides a dynamically controlled, intrinsically voltage regulated negative output voltage, referenced to ground, at the negative output terminal 43.

It should be appreciated that another switch matrix 48 consistent with the invention may reconfigurably step down the output voltage $V_{OUT}$, in either noninverted or inverted form. For example, when stepping down (decreasing) the output voltage $V_{OUT}$ with respect to the input voltage $V_S$, the fly capacitor $C_F$ alone may be coupled across the load capacitor $C_L$. Consequently, a power converter 40 configured to step down the voltage may permanently couple the second terminal 34 of the fly capacitor $C_F$ to ground, or be reconfigured by keeping switch M3 closed and switch M4 open, regardless of whether in charge or discharge phase. Thus, during the charge phase, the fly capacitor $C_F$ is coupled electrically across the energy source 12 so that it is charged. During the discharge phase, the fly capacitor $C_F$ only (i.e., without energy source 12) is coupled electrically across the load capacitor $C_L$.

As an additional example, other modifications would allow for inverting the input voltage $V_S$ when the magnitude of the output voltage $V_{OUT}$ is less than the magnitude of the input voltage $V_S$ ($0 > V_{OUT} > -V_S$). Instead of switching the load capacitor $C_L$ as shown in FIG. 4, the load capacitor $C_L$ has its first terminal 32 electrically coupled to ground and to the positive output terminal $V_{OUT}^+$ 42. The second terminal 35 of the load capacitor $C_L$ is electrically coupled to the negative output terminal $V_{OUT}^-$ 43. During the charge phase, the fly capacitor $C_F$ is charged across the energy source 12 as described above. During the discharge phase, the fly capacitor $C_F$ alone is coupled across the load capacitor $C_L$ as described above for a noninverting step down configuration. Since the positive output terminal $V_{OUT}^+$ 42 is electrically coupled to ground, the negative output terminal $V_{OUT}^-$ 43 will be dynamically controlled.

Analysis of Dynamically Controlled Charge Pump

Figure 5:
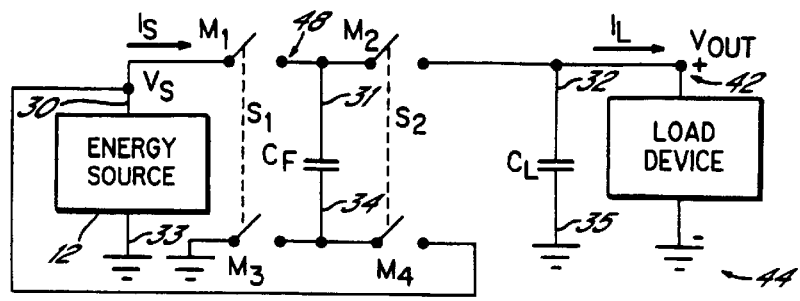
FIG. 5 is another embodiment of a circuit for a power output stage for the power converter of FIG. 3.

Referring to FIG. 5, one embodiment of a charge pump power output stage 44 (or "charge pump") is shown for use with the power converter of FIG. 3. The power output stage 44 is operated in two phases: charge and discharge, (i.e., pump) as described above for the oscillator-controlled power converter 20 of FIG. 2. The power output stage 44 is coupled between the energy source 12 that provides an input voltage $V_S$, and the load device 14 that accepts a current load $I_L$. Unlike FIG. 2, no voltage regulator 22 is depicted. The power output stage 44 is configured with load capacitor $C_L$, fly capacitor $C_F$, and four power switches M1–M4 as described above for FIG. 2. In order to illustrate the advantages of dynamically controlling a charge pump in accordance with one aspect of the invention, the following analytical derivation describes how the power output stage 44 may be efficiently switched. The power controller 46 divides the operation of the charge pump into two phases: charge and discharge. Thus, the terms "charge" and "discharge" refer to the fly capacitor $C_F$. During the charge phase, the input voltage $V_S$ charges the fly capacitor $C_F$, and the load capacitor $C_L$ supplies power to the load. During the discharge phase, charge flows from the fly capacitor $C_F$ to both the load and load capacitor $C_L$. Thus, the terms "charge" and "discharge" refer to the fly capacitor $C_F$. Two parameters affect the operation of the charge pump:

1. $\epsilon$—The fraction of the input voltage $V_S$ to which the fly capacitor $C_F$ is charged, where $0 < \epsilon < V_S$.
2. $T_{DIS}$—The minimum amount of time that the fly capacitor $C_F$ is discharged to boost the output voltage $V_{OUT}$.

Figure 6:
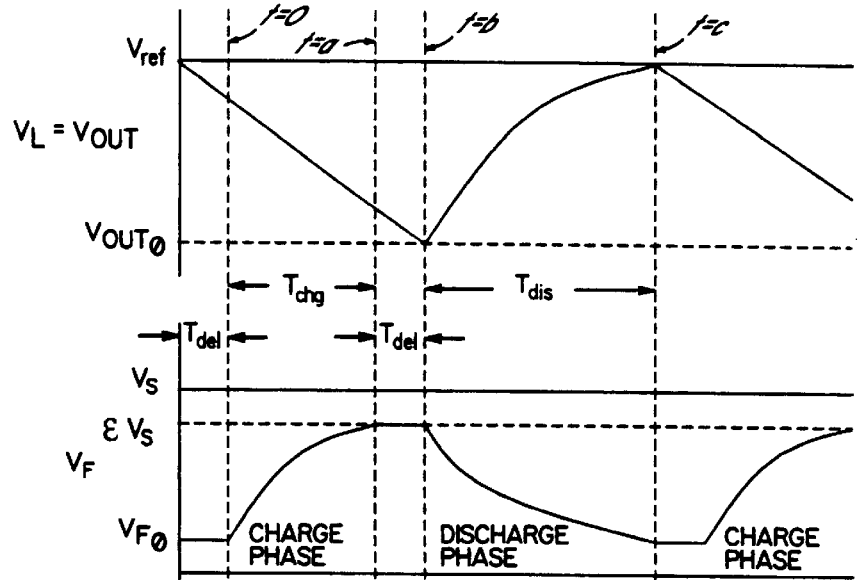
FIG. 6 is a voltage plot of boundary conditions for the maximum load condition for the power output stage of FIG. 5.

The boundary conditions for the power output stage 44 that must be satisfied to supply the maximum load current $I_L$ are shown in FIG. 6. The output voltage $V_{OUT}$ drops as the fly capacitor $C_F$ is charged during the charge phase. At the end of the following discharge phase, enough electrical charge must be transferred to increase the load voltage $V_{OUT}$ back to the reference voltage $V_{REF}$.

For purposes of this analysis, it is assumed that the power switches M1–M4 and storage capacitors $C_F$, $C_L$ will operate from an initially discharged condition (i.e., $V_{OUT}=0$, $V_F=0$) at time (t)=0, regardless of how low the input voltage $V_S$ is or whether a load device 14 is present. Furthermore, the analysis assumes a first and second control loop 56, 58 implementation wherein the state of charge is monitored for both the load capacitor $C_L$ and fly capacitor $C_F$ respectively. Moreover, a load voltage $V_L$ across the load capacitor $C_L$ will be used interchangeably with the output voltage $V_{OUT}$.

During startup, the power output stage 44 goes through many charge-discharge phases until the output voltage $V_{OUT}$ charged on $C_L$ rises above a predetermined value (desired output voltage), or voltage reference, $V_{REF}$. After $C_L$ has been fully charged (i.e., $V_{OUT}>V_{REF}$), the power output stage 44 will remain in the discharge phase until a load is applied, causing the output voltage $V_{OUT}$ to fall below the reference voltage $V_{REF}$ ($V_{OUT}<V_{REF}$), as depicted at the left-most portion of FIG. 6. A dead time delay $T_{DEL}$ occurs before a charge phase is initiated at time (t)×0. The fly capacitor $C_F$ is charged until its voltage $V_F$ reaches a fraction of the input voltage $\epsilon V_S$ at time (t)=a. After $C_F$ has been charged, the power output stage 44 returns to the discharge phase for a minimum period of time given by $T_{DIS}$, beginning at time (t)=b and ending at time (t)=c. This minimum time $T_{DIS}$ provides sufficient time for the discharge of the fly capacitor $C_F$. After this minimum discharge time, the power output stage 44 remains in the discharge phase while $V_{OUT}>V_{REF}$. Since this analysis illustrates a maximum power capacity situation, $V_{OUT}$ is immediately below $V_{REF}$ at the time (t)=c. Thus, the reference voltage $V_{REF}$ has not been exceeded during the discharge phase, and the charge phase/discharge phase is performed again.

A dead time delay $T_{DEL}$ between time (t)=a and time (t)=b occurs between the charge and discharge phases with the switches M1–M4 all open to eliminate any possibility of a momentary short circuit (i.e., an intervening delay to mitigate transconductance). For example, if switches M1 and M2 are closed at the same time, then the positive terminal 30 of the energy source 12 is shorted to the positive output terminal 42. If switches M1 and M4 are closed at the same time, the fly capacitor $C_F$ is shorted, degrading performance and possibly causing damage due to heat generation.

This analysis illustrates that an opportunity exists to switch the switch matrix at an optimal rate. First, if the output voltage $V_{OUT}$ exceeds the reference voltage $V_{REF}$ after the minimum discharge time $T_{DIS}$, an opportunity exists to remain in the discharge phase. Unnecessary (and thus inefficient) switching back to the charge phase is delayed as appropriate. Similarly, sensing when the fly capacitor $C_F$ is charged similarly avoids unnecessary switching due to a charge time $T_{CHG}$ that is too short or avoids a missed opportunity to transfer more charge when charge time $T_{CHG}$ is too long.

For applications utilizing a battery as an energy source 12, the power output stage 44 of the invention advantageously may satisfy several performance constraints over the lifetime of the battery while maximizing battery efficiency. Increasing the efficiency will extend the service life of the battery. The performance constraints include the minimum value for the peak output load current $I_L$ that can be supplied without exceeding a limit on the allowable output voltage ripple $V_{RIP}$. The output voltage ripple $V_{RIP}$ is the range of the fluctuation of the output voltage $V_{OUT}$. A maximum acceptance value for the operating frequency (i.e., rate of cycling between charge and discharge phases) is also required to minimize noise in audio applications. If the operating frequency is too high, charge consumed by the power output stage 44 will reduce the efficiency of the charge pump. Some of the objectives are conflicting. For example, although a high operating frequency reduces the output voltage ripple $V_{RIP}$, it also reduces the efficiency of the power output stage 44. Optimizing thus requires finding a subset of parameters for which the performance constraints can be met. If there is adequate margin, the design can then be optimized by selecting the values within this subset that maximize the efficiency of the design. This will provide advantages for a power converter 40, such as increased battery life while satisfying the output performance constraints. The following illustrates optimizing the power output stage 44 with power switches M1–M4 and typical power requirements.

Starting with the equations for the circuit depicted in FIG. 5, the loop currents and node voltages can be found as a function of the load current $I_L$ and fixed parameters during the charge and discharge cycles of the power output stage 44. The fixed parameters include the input voltage $V_S$, resistance of power switches M1–M4, capacitance values $C_F$ and $C_L$, and the reference voltage $V_{REF}$. Although the input voltage $V_S$ may change over time, the worst case analysis assumes that it is fixed at its lowest expected value during its lifetime. Some of the other fixed parameters are fixed in that they are selected for a given design (e.g., size of capacitors $C_F$, $C_L$, type of power switch M1–M4, etc.). The variable parameters are $\epsilon$ and $T_{DIS}$. By evaluating boundary conditions, specific solutions for the equations can be found. The boundary conditions are selected such that the load current $I_L$ is the maximum possible for the current set of fixed and variable parameters. The solutions for the differential equations can then be solved for the maximum load current $I_L$ that can be supplied for a specific set of parameters. By varying the parameters, the maximum load current $I_L$ over a range of these values can be found. The maximum load current $I_L$ is a continuous function of the parameters. This implies that if the largest value for the maximum load current $I_L$ exceeds the minimum acceptable value, a subset of parameters will also satisfy this condition. The efficiency of the power output stage 44 can then be maximized over this subset of parameter values, providing efficiency while satisfying the minimum performance constraints.

During the discharge phase, the voltage across $C_F$ and $C_L$ are:

$$V_F = V_{F0} - \frac{C_L}{C_L + C_F} V_{OUT}(1 - e^{-\lambda_{DIS}T_{DIS}}) - \frac{1}{C_L + C_F} I_L t$$

$$V_L = V_{L0} - \frac{C_F}{C_L + C_F} V_{OUT}(1 - e^{-\lambda_{DIS}T_{DIS}}) - \frac{1}{C_L + C_F} I_L t$$

where:

$$V_{OUT} = (V_S + V_{F0} - V_{L0}) - \frac{C_F}{C_L + C_F} I_L R_{DIS}$$

$$\lambda_{DIS} = \frac{C_L + C_F}{R_{DIS} C_L C_F}$$

and $V_{F0}$ and $V_{L0}$ are the initial fly capacitor voltage $V_{F0}$ and load voltages $V_{L0}$ at the start of the discharge cycle.

When the fly capacitor $C_F$ is being charged, the load capacitor $C_L$ is being discharged. During the charge phase, the voltage across $C_F$ and $C_L$ are:

$$V_F = V_{FO} + (V_S - V_{FO})(1 - e^{-\lambda_{CHG} T_{DHG}})$$

$$V_L = V_{LO} - \frac{1}{C_L} I_L t$$

where:

$$\lambda_{CHG} = \frac{1}{R_{CHG} C_F}$$

The initial fly and load voltages $V_F$, $V_L$ are at the start of the charge phase.

This set of four equations also has four unknown values: $V_F$, $V_L$, $I_L$, and $T_{CHG}$, and therefore will have a unique solution (if one exists). The algorithm for finding this solution using the boundary conditions illustrated in FIG. 6 is as follows. A charge time $T_{CHG}$ is found by evaluating the following equation:

$$0 = A(1 - e^{\lambda_{CHG} T_{CHG}}) + \frac{B(T_{CHG} + T_{DIS} + 2T_{DEL})}{D + C T_{CHG}}$$

where:

$$A = (1 - \varepsilon) V_S$$

$$B = \frac{C_L}{C_L + C_F}[(1+\varepsilon)V_S - V_{REF}](1 - e^{-\lambda_{DIS} T_{DIS}})$$

$$C = 1 - \frac{C_F}{C_L + C_F}(1 - e^{-\lambda_{DIS} T_{DIS}})$$

$$D = \frac{C_L}{C_L + C_F} \frac{C_F}{C_L + C_F} R_{DIS} C_F (1 - e^{-\lambda_{DIS} T_{DIS}}) + \frac{C_L}{C_L + C_F} T_{DIS} + 2 C T_{DEL}$$

The value of $T_{CHG}$ that solves this equation must be constrained to be greater than zero to be valid. Solutions will not exist for all combinations of the fixed and variable parameters.

With $T_{CHG}$ known, the maximum load current $I_L$ for the current value of the parameters is given by:

$$I_L = \frac{C_L C_F}{C_L + C_F}[(1+\varepsilon)V_S - V_{REF}]$$

$$(1 - e^{-\lambda_{DIS} T_{DIS}}) \Big/ \left[1 - \frac{C_F}{C_L + C_F}(1 - e^{-\lambda_{DIS} T_{DIS}})\right](T_{CHG} + 2T_{DEL}) +$$

$$\frac{C_L}{C_L + C_F}\left[\frac{C_F}{C_L + C_F} R_{DIS} C_F (1 - e^{-\lambda_{DIS} T_{DIS}}) + T_{DIS}\right]$$

The voltage across the fly capacitor $V_F$ at the end of the discharge phase is:

$$V_{FO} = \varepsilon V_S - \frac{C_L}{C_L + C_F}[(1+\varepsilon)V_S - V_{REF}](1 - e^{-\lambda_{DIS} T_{DIS}}) +$$

$$\frac{1}{C_L + C_F}\left[\frac{C_l}{C_L + C_F} R_{DIS} C_F (1 - e^{-\lambda_{DIS} T_{DIS}}) -\right.$$

$$\left.(T_{CHG} + 2T_{DEL})(1 - e^{-\lambda_{DIS} T_{DIS}}) - T_{DIS}\right] I_L$$

The lowest voltage reached by the load voltage $V_L$ at the beginning of the discharge phase is:

$$V_{LO} = V_{ref} - \frac{1}{C_L} I_L (T_{CHG} + 2T_{DEL})$$

The difference between this and the reference voltage $V_{REF}$ is the ripple $V_{RIP}$:

$$V_{RIP} = V_{REF} - V_{LO}$$

The operating frequency (i.e., frequency of the voltage ripple) for this set of parameters is:

$$f = \frac{1}{T_{CHG} + T_{DEL} + 2T_{DEL}}$$

The peak input voltage is also interesting to evaluate, and can occur at either the beginning of the charge phase, or during discharge. Because the load current $I_L$ is assumed to be constant, the peak input current $I_S$ during discharge occurs at the beginning or end of this phase. The peak current during the entire cycle is the maximum of these values:

$$\bar{I}_S = \max\{\bar{I}_{CHG}, \bar{I}_{DIS_1}, \bar{I}_{DIS_2}\}$$

$$\bar{I}_{CHG} = \frac{V_S - V_{FO}}{R_{chg}}$$

$$\bar{I}_{DIS_1} = \frac{(1+\varepsilon)V_S - V_{LO}}{R_{dis}}$$

$$\bar{I}_{DIS_2} = \frac{(1+\varepsilon)V_S - V_{LO}}{R_{DIS}} \varepsilon^{-\lambda T_{DIS}} + \frac{C_F}{C_L + C_F}(1 - \varepsilon^{-\lambda T_{DIS}}) I_L$$

Referring to Table 1, the maximum load current $I_L$, voltage ripple $V_{RIP}$, peak input current $\bar{I}_L$, and the operating frequency were evaluated as an illustration for a combination of fixed parameters including the reference voltage $V_{REF}$ and the input voltage $V_S$ at which the charge pump is expected to operate reliably, and the fly ($C_F$) and load ($C_L$) capacitance values. In this illustration of a power output stage 44, the resistance of the capacitors $C_L$, $C_F$ is ignored. The time delay $T_{DEL}$ used to prevent all switches M1–M4 from being closed at the same time was fixed at 0.25 μSec. Two time delays $T_{DEL}$ occur in each charge-discharge cycle.

TABLE 1

Charge Pump Operating Points for Moderate Capacitance Values.
Optimized Charge Pump
$C_F$ = 22 μF,
$C_L$ = 22 μF,
Vref = 1.2V,
Vs = 0.8V

| Operating | $R_{CHG} = R_{DIS}$ (Ω) | | |
|---|---|---|---|
| Point | 0.1 | 0.2 | 0.3 |
| ε | 0.8490 | 0.8306 | 0.8214 |
| $T_{DIS}$ (μSec) | 1.8571 | 3.0204 | 3.9898 |
| $I_L$ (mA) | 838.17 | 447.09 | 306.12 |
| $V_{rip}$ (mV) | 8.9955 | 7.1155 | 6.2130 |
| $I_S$ (A) | 2.8818 | 1.3580 | 0.8779 |
| freq (kHz) | 288.18 | 153.33 | 118.275 |

The series resistances encountered during the charge ($R_{CHG}$) and discharge ($R_{DIS}$) phases have the most significant effect on the maximum current capacity of the power output stage 44, as shown by the three operating point columns in Table 1. Although larger fly ($C_F$) and load ($C_L$) capacitors improve this capability, the amount of improvement is mitigated as their resistance increases. Increasing the capacitor values appears to have a greater proportional effect on reducing the output voltage ripple $V_{RIP}$, rather than the current capacity.

What the analysis described above shows is that a power output stage 44 may be dynamically controlled to achieve a desired output voltage $V_{OUT}$ given that the output voltage is sensed as feedback.

Typical "electronic" capacitors (dielectric between conductors, e.g., tantalum polymer), widely used in electronic devices, are characterized by self discharging within microseconds to milliseconds, and having a cycle life of 1–10 million charge cycles. The disadvantage of the short self-discharge time for electronic capacitors means that oscillator-based charge pumps 20 must operate at duty cycles that are between the rate in which the electronic capacitor can be charged and discharged and the rate at which the electronic capacitor will self-discharge. Consequently, known oscillator controllers 26 for charge pump output stages 24 do not allow for charge pump operating frequencies in the 50–200 Hz range. At lower demand levels, the charge pump would advantageously operate below 1 Hz.

Consequently, known oscillator-based charge pumps 20 cannot take advantage of ultra-capacitors and similar high storage devices that have self-discharge times measured in weeks or months. An ultra-capacitor is an electrochemical double layer capacitor that stores energy electrostatically by polarizing an electrolytic solution. There is no chemical reaction involved in its energy storage physics. Consequently, the ultra-capacitor is extremely bi-directional (recoverable) and can thus be charged and discharged thousands of times, unlike comparable storage methods like electrochemical batteries. An example of a suitable ultra-capacitor is the PS-10 available from Maxwell® Technologies, San Diego, Calif.

It should be appreciated that the term "ultra-capacitor" is meant to encompass a number of types of large capacitors generally characterized as having a high efficiency due to relatively low charge leakage. Thus, "ultra-capacitor" includes double layer electrolytic capacitors (often known as super capacitors, ultra capacitors, and power capacitors), as well as pseudo capacitors.

In accordance with another aspect of the present invention, charge pumps incorporating ultra-capacitors for the fly capacitor $C_F$ and load capacitor $C_L$ are capable of providing 5 W of electrical power or more, for which rate an operating frequency of 50–200 Hz would be appropriate.

The dynamic controller 50 of one embodiment of the invention, as will be described in more detail below, is capable of operating at the frequencies of the oscillator-based charge pumps 20; however, the dynamic controller 50 is also capable of operating at extremely low operating frequencies. Consequently, the dynamic controller 50 may take advantage of the additional storage capabilities of ultra-capacitors.

Sub-one Volt Power Converter

Figure 7:
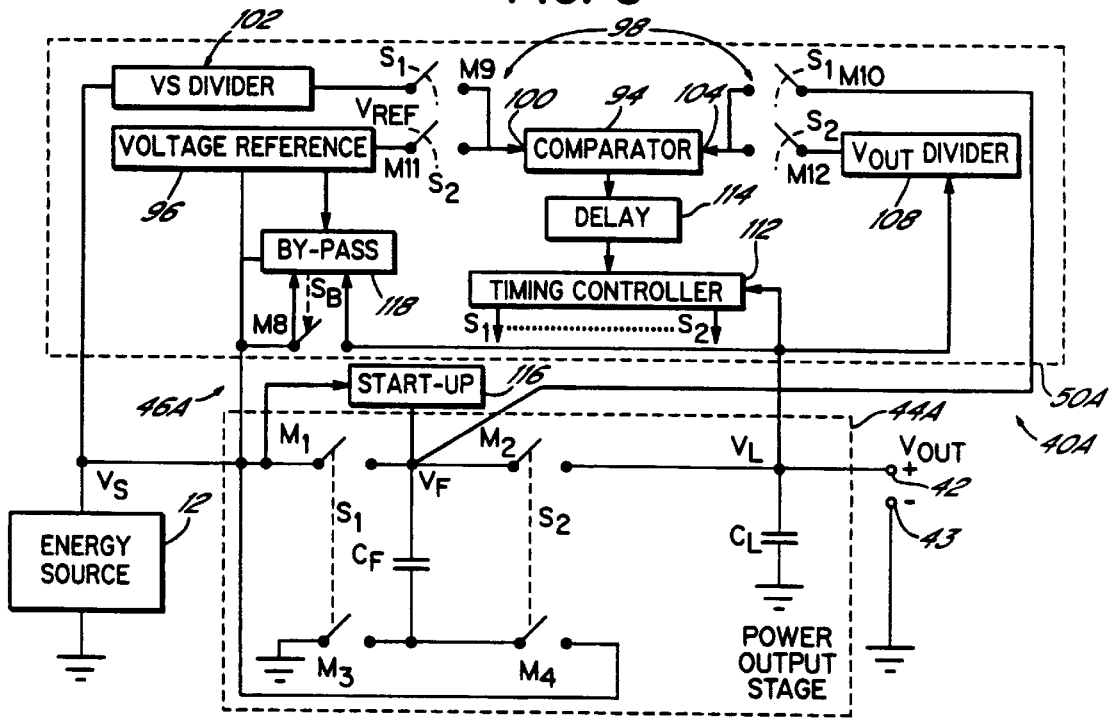
FIG. 7 is a top-level block diagram of an embodiment of a dynamically controlled power converter.

Referring to FIG. 7, one embodiment of a dynamically controlled power converter 40A in accordance with the principles of the invention is depicted in a top-level block diagram form. As will become apparent in the discussion below, this illustrative embodiment allows for a step up or step down of an input voltage $V_S$ from an energy source 12 to a regulated output voltage $V_{OUT}$ by dynamically controlling the noninverting charge pump power output stage 44A. The power converter 40A may also operate at an input voltage $V_S$ below one (1) volt. Specifically, power switches M1–M4 adapted to respond to low threshold switching signals S1 and S2. Moreover, as will become apparent below, the power converter 40A may readily be implemented as an integrated circuit and thus be of small size and cost.

The illustrative power converter 40A of FIG. 7 includes a power controller 46A and the power output stage 44A similar to one described above for FIG. 5. The power controller 46A includes a comparator 94 responsive to $V_{OUT}$ dropping below a reference voltage $V_{REF}$ to generate a switching signal. Advantageously, the comparator 94 is further responsive to the voltage of the fly capacitor $V_F$ and the input voltage $V_S$ for controlling the duration of the charge phase. Specifically, a comparator input switching circuit 98 enables the same comparator 94 to be used during both the charge and discharge cycles as follows.

During the charge phase, a predetermined fraction of the input voltage $\epsilon V_S$ is coupled to a first comparator input 100 via comparator input switch M9 that closes in response to charge cycle switch signal S1. A $V_S$ divider 102 interposed between switch M9 and the energy source 12 provides the predetermined fraction $\epsilon$ and the resulting reductions of $V_S$. The fly capacitor voltage $V_F$ is coupled to a second comparator input 104 via comparator input switch M10 also in response to charge cycle switch signal S1. The comparator then generates a switching signal when the fly capacitor voltage $V_F$ reaches a predetermined fraction of the input voltage $\epsilon V_S$.

During the discharge phase, the reference voltage $V_{REF}$ is coupled to the first comparator input 100 via comparator input switch M11 in response to discharge cycle switch signal S2. Also, a predetermined fraction of $V_{OUT}$ provided by $V_{OUT}$ divider 108 is coupled to the second comparator input 104 by comparator input switch M12 in response to switch signal 52.

With regard to the scaling of various inputs to the comparator 94, it should be apparent to those skilled in the art that various combinations of scaling may be appropriate for specific applications. For instance, the illustrative example is based on a step up power converter configuration and a voltage reference $V_{REF}$ that is relatively low. Thus, the $V_{OUT}$ divider 108 allows scaling down the $V_{OUT}$ as needed to use a single reference voltage to achieve a range of desired output voltages $V_{OUT}$. In applications where the $V_{OUT}$ is lower than the reference voltage, a $V_{OUT}$ multiplier may be used instead or a divider used to scale down the output from the voltage reference 96 to a desired reference voltage $V_{REF}$. Similarly, other variations would be apparent for step down power converters. Moreover, a second comparator may be used in addition to comparator 94 if necessary.

The switching command from the comparator 94 is received by a timing controller 112 for generating charge switch signal S1 and discharge switch signal S2. Advantageously interposed between the comparator 94 and the timing controller 112 is a delay 114 for causing a hysteresis in switching for purposes such as avoiding unnecessary switching and to reduce the effects of EMI emissions from higher operating frequencies.

A bootstrap start-up circuit 116 is depicted in FIG. 7 for initiating operation of the power output stage 44A when it is discharged and the dynamic controller 50A has not taken control of the power output stage 44A, as will be described in more detail with regard to FIG. 11.

A start-up circuit 116 is necessary for integrated circuit embodiments of the present embodiment in which semiconductors may latch to ground during a cold start (i.e., initially discharged load capacitor $C_L$), preventing the dynamic controller 50A from taking control of the power output stage 44A. More generally, the start-up circuit may shorten the time required during a cold start until operating at the desired output voltage $V_{OUT}$.

The start-up circuit 116 is depicted as coupling the positive terminal 30 of the energy source 12 to the first terminal 31 of the fly capacitor $C_F$ rather than directly to the first terminal 32 of the load capacitor $C_L$. However, due to a choice of a normally closed switch M2, it should be appreciated that the start-up circuit is effectively coupled to the load capacitor $C_L$ in start-up (cold start) situations, as is discussed below.

A by-pass control circuit 118 included in the power controller 46A may be used during certain situations such as a transient high load beyond the capacity of the power converter 40A. The transient high load is characterized by a decrease in the output voltage (voltage droop) that is of a predetermined magnitude to require additional capacity. Thus, the by-pass circuit 118 may compare $V_{OUT}$ to the reference voltage $V_{REF}$. When a voltage droop is detected in $V_{OUT}$, the by-pass circuit 118 may generate a by-pass switch signal $S_B$ for by-pass switch MB that responds by coupling the positive terminal 30 of the energy source 12 directly to the output terminal 42. Similarly, the by-pass circuit 118 may respond to an impending failure of the power converter 40A due to low input voltage wherein extending service life is best served by removing the power consumption of the power converter 40A. Thus, the by-pass circuit 118 also compares the input voltage $V_S$ to the reference voltage $V_{REF}$ and operates switch MB accordingly.

Figure 8:
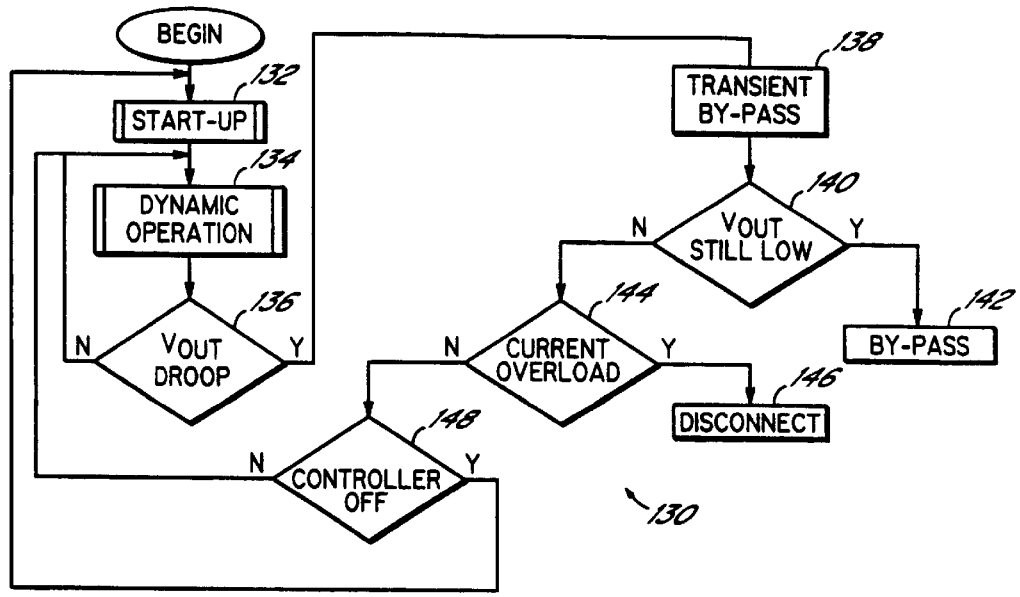
FIG. 8 is a flow diagram for the operation of the power converter of FIG. 7.
Figure 9:
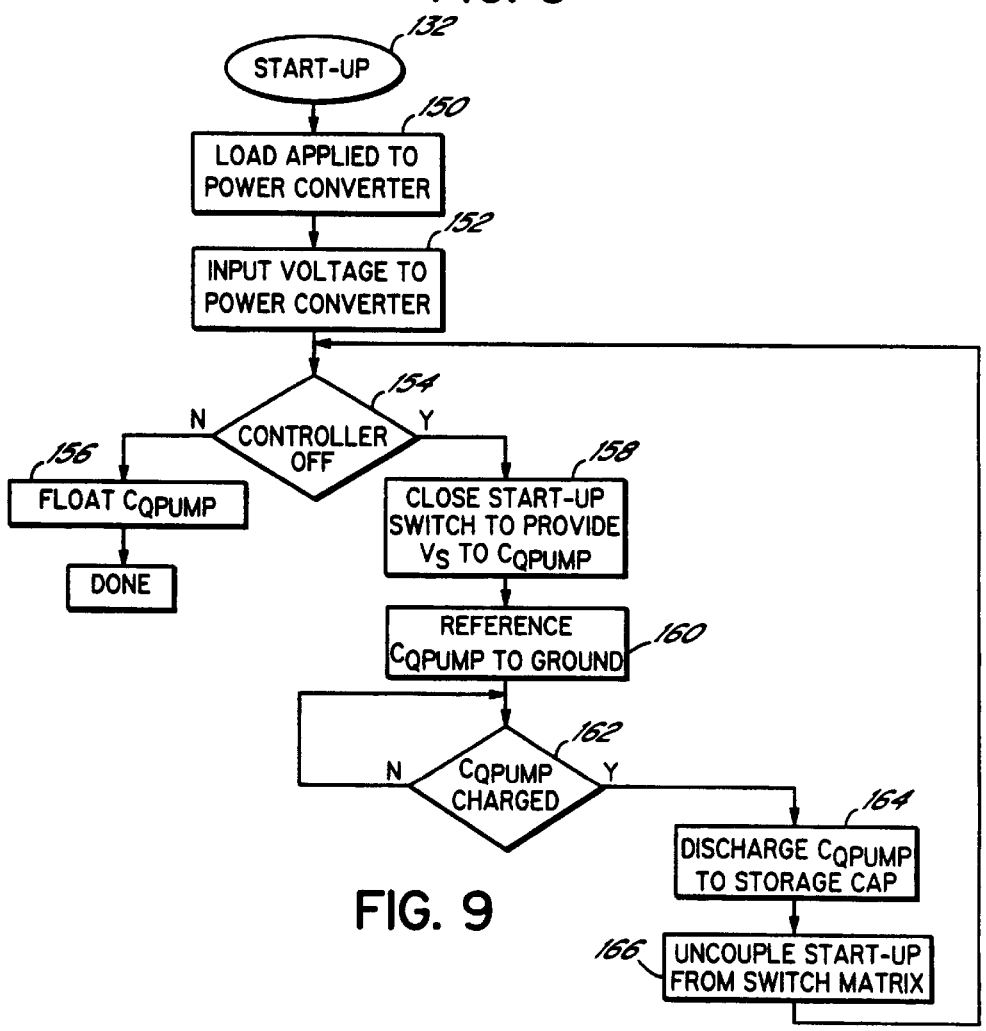
FIG. 9 is a flow diagram for the start-up operation of FIG. 8.
Figure 10:
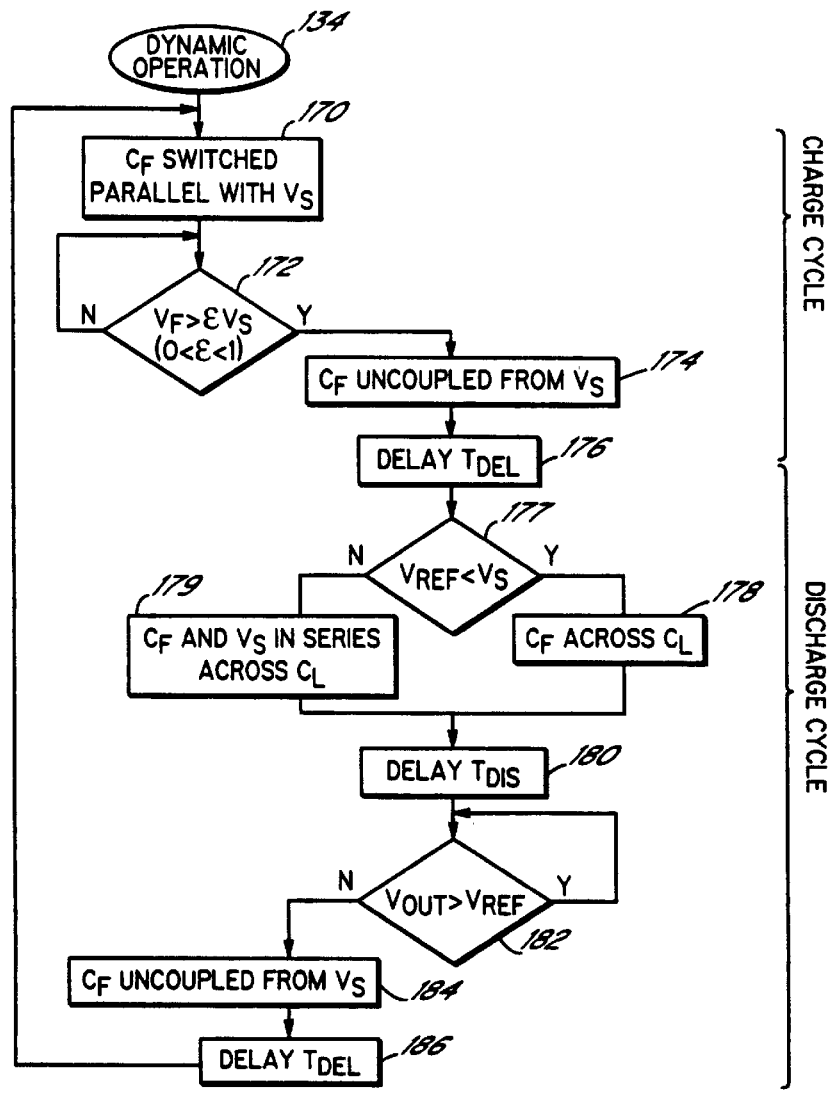
FIG. 10 is a flow diagram for the dynamic operation of FIG. 8.

The operation of the power converter 40A of FIG. 7 is illustrated in the flow diagrams of FIGS. 8–10. Referring to FIG. 8, the power converter operation 130 begins with the storage elements discharged, and thus a start-up operation 132 is performed to prevent latch up to ground in integrated circuit implementations, as will be described in FIGS. 9 and 11. After start-up operation 132, the power converter operation 130 moves into a dynamic operation 134, as will be described with regard to FIG. 9.

Dynamic operation 134 generally continues until interrupted, as represented in block 136 by a determination as to whether an output voltage $V_{OUT}$ droop has occurred, and if not, dynamic operation 134 continues. A voltage droop in $V_{OUT}$ is a drop in the output voltage $V_{OUT}$ indicating a large transient load that may exceed the capability of the power converter 40A. If in block 136 $V_{OUT}$ droop is detected, then a transient by-pass is performed electrically coupling the output terminals to the energy source for a period of time (block 138) as discussed above. In some applications consistent with the invention, the transient by-pass electrically uncouples the power converter 40A from the energy source 12 and the output terminals 42, 43. An advantage of uncoupling includes avoiding discharging of the power output stage 44A that would result in a recovery period after the transient ends. In other applications consistent with the invention, the transient by-pass does not uncouple the power converter 40A from the energy source 12 and the output terminals 42, 43 so that the power converter 40A contributes to providing the power demanded by the load device 14.

If the output voltage still remains low (block 140), then the by-pass may be placed in a latched state (block 142). If in block 140 $V_{OUT}$ has recovered, then another protective feature is performed in block 144 by making a determination as to whether a current overload condition exists. For example, the energy source may have a safety limitation on the amount of current that can be provided, perhaps for a certain duration. Alternatively, the load device 14 drawing the output current may be in a failure mode that is signaled to the power converter operation 130. Thus, if in current overload (block 144), the output terminal is disconnected from the energy source (block 146). If, however, in block 144 there is no current overload, then in block 148, a determination is made as to whether or not the controller is off. This represents situations where the various protection measures may result in a situation where the power converter needs to be restarted. Thus, if the controller is off (block 148), then the power converter operation 130 returns to start-up operation (block 132), else to dynamic operation (block 134).

It should be appreciated that a sequential flow diagram is shown in FIG. 8 illustrates various protection and modes that may be performed independently and continuously or that various combinations of protective features may be included consistent with the invention.

Referring to FIG. 9, the start-up operation 132 referenced in FIG. 8 is depicted in flow diagram form. An advantage of this start-up operation 132 includes illustrating how a power converter 40A in accordance with the invention may be started with less than one volt of input voltage. This is especially desirable for integrated circuit applications wherein a discharged storage capacitor, such as the load capacitor $C_L$, may otherwise result in an inoperative power controller 46A. Moreover, the start-up operation 132 suggests use of the invention as a low output demand alternative charge pump wherein the power consumed by the overall power converter may be reduced.

Typical oscillator-based power converters 20 incorporate a bootstrap external large power Schottky diode electrically coupled from the energy source 12 to the load capacitor $C_L$. The Schottky diode conducts when the load capacitor voltage $V_L$ is low, to begin charging the load capacitor $C_L$, as well as providing power to the load device 14. Without the additional Schottky diode, the load device 14 would tend to prevent the load capacitor $C_L$ from charging due to latch-to-ground tendencies of typical integrated circuit switch matrices 48.

Adding the Schottky diode prevents desirable miniaturization of the oscillator-controlled power converter 20. In addition, the Schottky diode consumes power during normal operation of the oscillator-controlled power converter 20, thereby reducing efficiency.

Therefore, it is desirable to start the dynamically controlled power converter 40A without detrimentally affecting efficiency during normal operation. It is also desirable to do so in a way that may be integrated with the power converter 40A without external components.

The start-up operation 132 begins with an initial condition in block 150 that a load is already applied to the power converter and in block 152 that an input voltage is available to the power converter. Then a determination is made as to whether the power controller is off and not controlling the power output stage (block 154). If the power controller is on (block 154), then a small start-up capacitor $C_{QPUMP}$ is floated (block 156) and start-up operation 132 is done.

If in block 154 the controller is off, then a start-up switch is closed to provide input voltage $V_S$ to the start-up capacitor $C_{QPUMP}$ (block 158) and the start-up capacitor $C_{QPUMP}$ is referenced to ground (block 160). When the start-up capacitor $C_{QPUMP}$ is charged (block 162), it is discharged into a storage capacitor (e.g., load capacitor) (block 164) and the start-up circuit including start-up capacitor $C_{QPUMP}$ is uncoupled from the switch matrix of the power converter (block 166). Then, the start-up operation 132 returns to block 154 to see if this start-up cycle was sufficient to activate the controller and subsequent start-up operation cycles repeat as necessary.

Referring to FIG. 10, the dynamic operation 134 referenced in FIG. 8 is illustrated in flow diagram form. First, the fly capacitor is switched into parallel with the input voltage $V_S$ so that the fly capacitor may be charged (block 170). When the fly capacitor voltage $V_F$ exceeds some predetermined fraction of the input voltage $V_S$ (e.g., 80% of $V_S$) (block 172), then the charge phase ends by uncoupling the fly capacitor $C_F$ from being in parallel with the input voltage $V_S$ (block 174) and delaying for a dead time delay $T_{DEL}$ (block 176).

The discharge cycle then begins in block 177 by determining whether the dynamic operation 134 is for step up or step down operation. If stepping up, then during discharge phase, the fly capacitor voltage $V_F$ is added to the input voltage $V_S$ whereas, if stepping down, the fly capacitor voltage $V_F$ is used alone. This selection may be predetermined and preset rather than being determined during each phase of the dynamic operation 134, although these additional determinations advantageously allow for adjusting the output voltage $V_{OUT}$ as desired such as by changing the reference voltage $V_{REF}$.

Thus, in block 177 a determination is made as to whether the reference voltage $V_{REF}$ is less than the input voltage $V_S$ (i.e., stepping down operation). If yes, then the fly capacitor $C_F$ alone is placed across the load capacitor $C_L$ (block 178). Otherwise, the input voltage $V_S$ and the fly capacitor $C_F$ are placed in series across the load capacitor $C_L$ (block 179). After either block 178 or 179, a minimum discharge time delay $T_{DIS}$ is then performed to allow full discharge of the fly capacitor $C_F$ without respect to the output voltage $V_{OUT}$ (block 180).

Then, the dynamic operation 134 waits in this state while the output voltage $V_{OUT}$ is greater than the reference voltage $V_{REF}$ (block 182). This is due to the non-compensated nature of the comparator. If the amount of charge transferred during the preceding charge/discharge cycle is insufficient to charge the load capacitor $C_L$ for $V_{OUT}$ to exceed $V_{REF}$, another subsequent charge/discharge cycle immediately is needed. In other instances, the preceding charge/discharge cycle is sufficient. Thus, the dynamic operation 134 then may continue waiting for a period of time until the load device or self-discharge of the load capacitor discharges the load capacitor sufficiently. When $V_{OUT}$ is not greater than $V_{REF}$, the fly capacitor $C_F$ is uncoupled from the load capacitor $C_L$ (block 184), which includes uncoupling the input voltage $V_S$ from the load capacitor $C_L$ if stepping up. Then, another dead time delay $T_{DEL}$ is imposed (block 186), and the cycle repeats by returning to the charge phase of block 170.

It should be appreciated that for clarity the aforementioned dynamic operation 134 begins with charging the fly capacitor $C_F$ until such time as a discharge phase is warranted. In the illustrative embodiment, however, the charge phase is, in effect, a nested operation within the discharge phase. Specifically, the power converter initiates and remains in a discharge phase until such time as additional charge is needed (e.g., $V_{OUT}$ drops below $V_{REF}$). Then a charge phase is performed. As soon as completed, then the discharge phase begins again after the requisite described delays. Thereafter, the power converter 40A remains in the discharge state again waiting for more needed charge.

Figure 11:
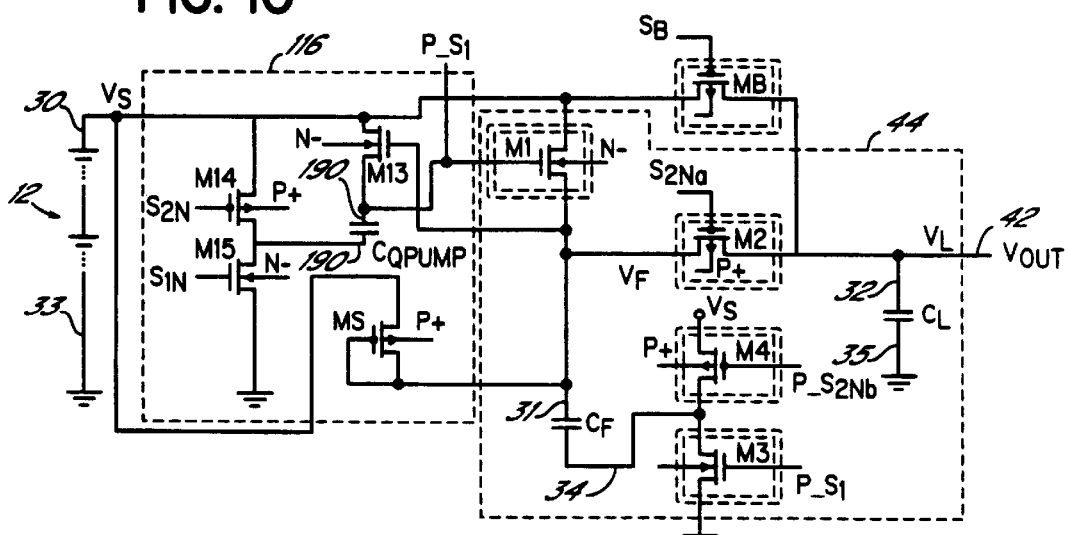
FIG. 11 is an embodiment of a circuit for a power output stage for the power converter of FIG. 7.

With reference to FIG. 11, an integrated power output stage 44A for the power converter 40A of FIG. 7 is advantageously illustrated by an integrated circuit implemented with a 0.35 micron double salicide process (two metal, two poly salicide) utilizing MOSFET transistor switches capable of low threshold (e.g., sub-one volt) control, as described in the following co-pending and commonly owned application filed on Mar. 22, 2000: U.S. Ser. No. 09/532,761, entitled "Lateral Asymmetric Lightly Doped Drain MOSFET", naming Ying Xu et al. (P&G Case 7992), which is hereby incorporated by reference. In addition to having a low threshold control, the disclosed MOSFET devices have a low on-resistance, directly contributing to the efficiency of the switch matrix 48 used in accordance with the invention.

The power switches M1–M4, as well as the by-pass switch MB have scaleable current capability to the desired peak output current by incorporating an array of low-threshold MOSFET devices, although represented as a single transistor in FIG. 11. The MOSFET power switches M1–M4 are advantageously designed for low on-resistance and high off-resistance for efficient operation of the switch matrix 48, as described in the above referenced application.

Generally, n-type MOSFET devices are chosen for being smaller to fabricate, faster to switch, and normally off without a gate voltage. In some instances, p-type MOSFET switches are advantageously used, however. First, as will become more apparent below, using a p-type power switch M2 between the first terminal 31 of the fly capacitor $C_F$ and the first terminal 32 of the load capacitor $C_L$ allows for a sub-one volt progressive start-up circuit 116 in accordance with one aspect of the invention that needs to only bias one power switch M1 in order to start the power converter 40A.

The start-up circuit 116 includes a p-type MOSFET startup switch MS configured to activate the start-up circuit 116 when the power output stage 44A is discharged. The various signals (e.g., S1, S2, S2N . . . ) for controlling the switching are discussed further herein below. The drain of MS is coupled to the input voltage $V_S$ and the gate and source are both coupled to the first terminal 31 of the fly capacitor $C_F$. The two power switches M3, M4 coupled to the second terminal 34 of the fly capacitor $C_F$ are n-type and thus open, so the fly capacitor $C_F$ is floating in this situation. However, the power switch M2 is a p-type transistor as mentioned and is thus closed with the power controller 46A initially unpowered in this situation. Consequently, the start-up switch MS also has its gate and source coupled to $V_{OUT}$ that is initially zero. Thus the gate of start-up switch MS is grounded, and the start-up switch MS begins to conduct the input voltage $V_S$ to the load capacitor $C_L$.

However, the current capability of this one small MOSFET is insufficient to charge the load capacitor $C_L$. Therefore, the start-up switch MS is used indirectly to close power switch M1 so that the input voltage $V_S$ will be provided to the load capacitor $C_L$. Specifically, the input voltage from the source of the start-up switch MS is coupled to the gate of n-type switch M13. Switch M13 is closed due to the input voltage $V_S$ from switch MS. When switch M13 closes, the input voltage $V_S$ at the drain is passed to the source, which in turn is coupled to a first terminal 190 of a start-up capacitor $C_{QPUMP}$. The second terminal 192 of the start-up capacitor $C_{QPUMP}$ is coupled to a transistor pair M14, M15 configured to ground the second terminal 192 of the start-up capacitor $C_{QPUMP}$ when the power controller 46A is inoperative. Otherwise, the transistor pair M14, M15 is configured to float the second terminal 192 of the start-up capacitor $C_{QPUMP}$. Specifically, the second terminal 192 of the start-up capacitor $C_{QPUMP}$ is coupled to the drain of p-type switch M15 and to the source of n-type switch M14. Switch M15 has its source grounded and has its gate biased by a negative bias to open switch M15 when the power controller 46A is operating. Therefore, when the power controller 46A is operating, the second terminal 192 of the start-up capacitor $C_{QPUMP}$ is disconnected from ground. Switch M14 has its drain coupled to the input voltage $V_S$ and has its gated biased by a positive bias to close switch M14 when the power controller is operating.

Figure 12:
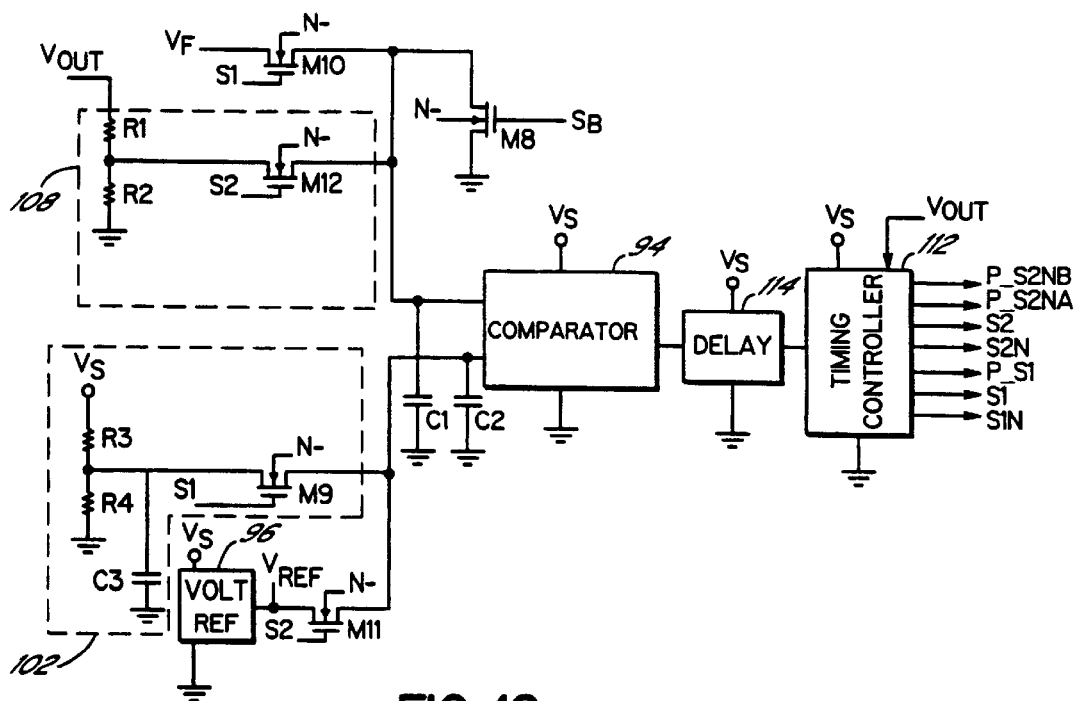
FIG. 12 is an embodiment of a power controller circuit for the power converter of FIG. 7.

Referring to FIG. 12, a circuit is shown that is suitable for the power converter 40A of FIG. 7. FIG. 12 illustrates one circuit embodiment for biasing the comparator 94 to perform comparisons during the charge phase and during the discharge phase. During the charge and discharge phases, the circuit will have previously been started and power controller 46A will be operating for generating the switching signals (e.g., S1, S2, etc.). During the charge phase with S1 closing M9 and M10, input voltage $V_S$ divider 102 reduces the input voltage $V_S$ by a predetermined fraction (e.g., 80%) for comparison with the fly capacitor voltage $V_F$, as discussed for FIG. 7. During the discharge phase with S2 closing M11 and M12, $V_{OUT}$ divider 108 scales the output voltage $V_{OUT}$ for the correct comparison to the reference voltage from the voltage reference 96.

FIG. 12 also illustrates that the timing controller 112 of the power controller circuit 46A provides a plurality of signals P_S2NB, P_S2NA, S2, S2N, P_S1, S1, S1N, described in more detail below, to perform the equivalent to the charge switch signal S1 and the discharge switch signal S2. This plurality of signals is required for the illustrative embodiment due to the power switches M1–M4 requiring more current than the other switches, and power switches M2, M4 are p-type and thus switch more slowly than n-type power MOSFET power switches M1, M3. Certain delays are required in the signals to the respective gates in order to prevent transconductance wherein one or both of M1, M3 is closed at the same time as one or both of M2, M4.

Figure 13:
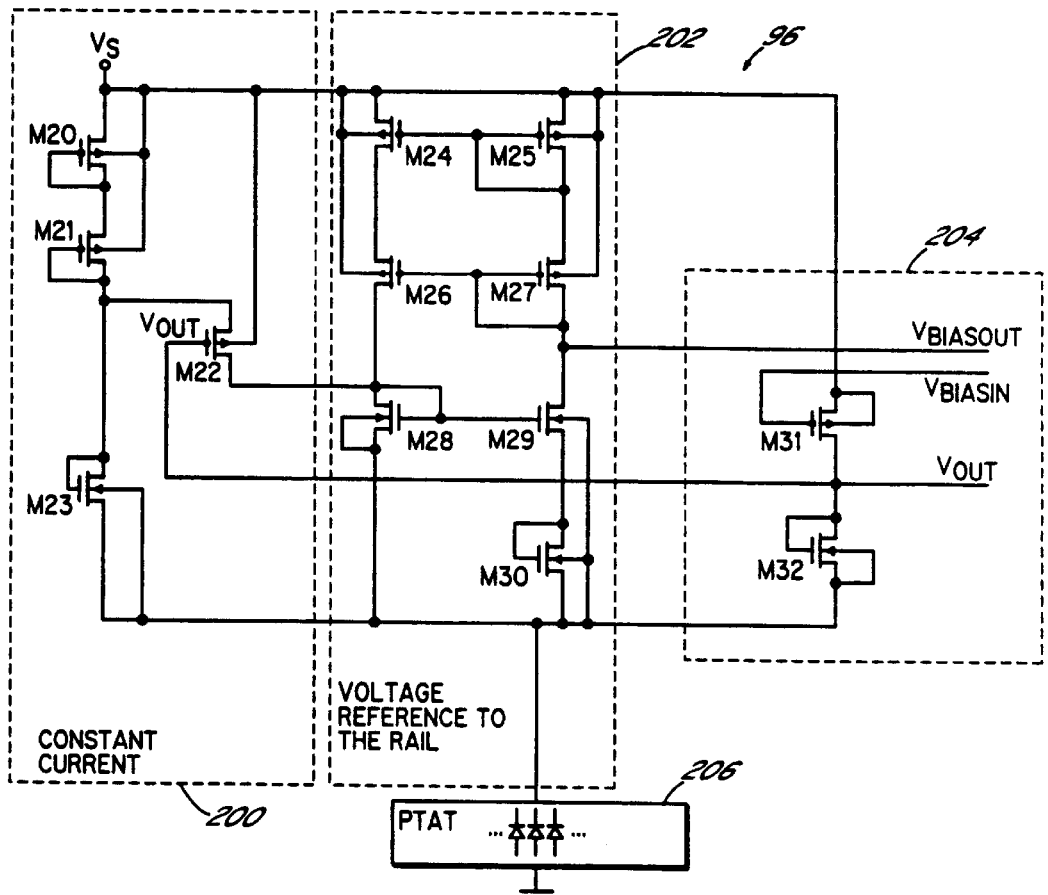
FIG. 13 is an embodiment of a voltage reference circuit for the power controller of FIG. 12.

Referring to FIG. 13, one embodiment of a voltage reference 96 is shown and is capable of sub-one volt input voltage $V_S$ operation in accordance with an aspect of the invention. A constant current circuit 200 powers a voltage reference-to-rail circuit 202, isolating the voltage reference-to-rail circuit 202 from changes in the input voltage $V_S$. An output buffer 204 amplifies an unamplified reference voltage from the voltage reference-to-rail circuit 202. In order to temperature compensate the voltage reference-to-rail circuit 202, a parallel diode array Proportional to the Absolute Temperature (PTAT) circuit 206 biases the circuit 202.

Figure 15:
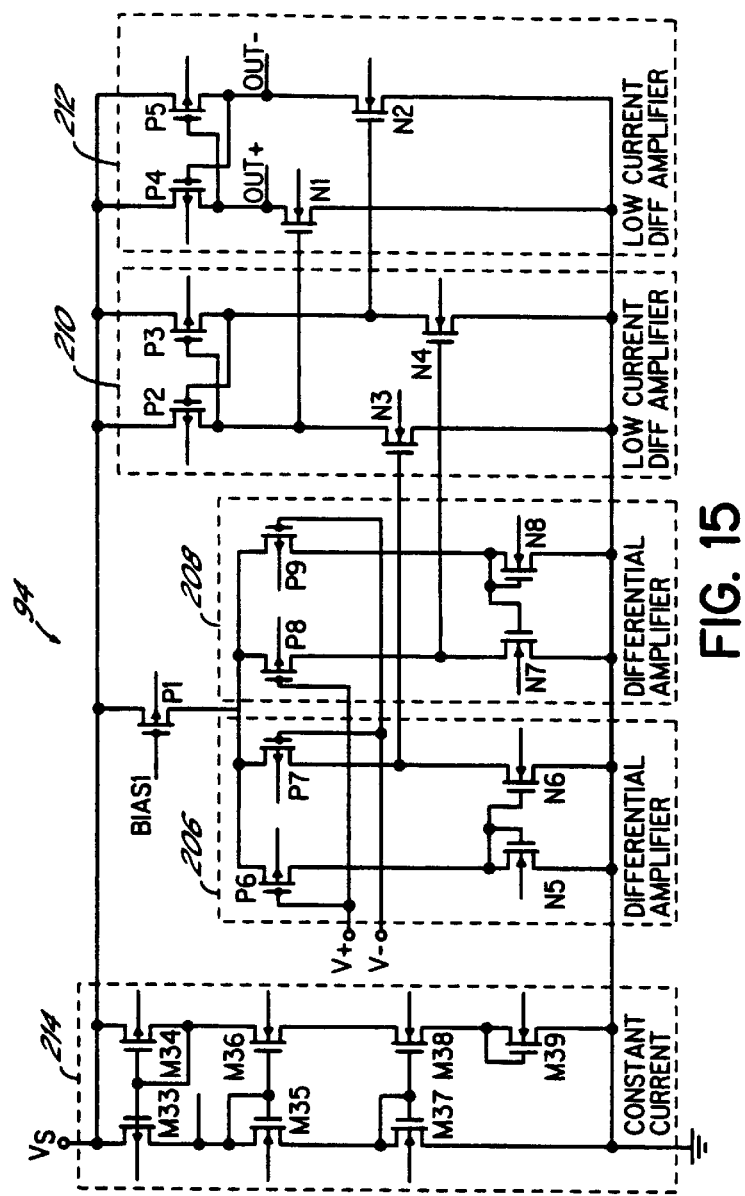
FIG. 15 is a more detailed circuit for the comparator circuit of FIG. 14.
Figure 14:
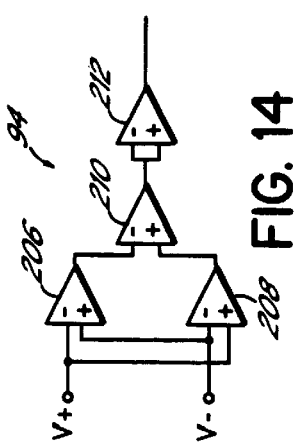
FIG. 14 is an embodiment of a comparator circuit for the power controller of FIG. 12.

Referring to FIGS. 14 and 15, one embodiment of a comparator 94 is depicted for the power controller 46A of FIG. 7. Differential amplifiers 206–210 are advantageously used since they are effective in rejecting common-mode signals. For example, common-mode signals may be induced noise on the inputs. Integrated circuit differential amplifiers have relatively low output gain. This has implications in two ways: non-linearity in an input transistor and in providing necessary current gain for later stages of the power controller 46A. For providing some cancellation of input non-linearity, a three differential amplifier combination is depicted, wherein the first differential amplifier 206 receives a V+ input at its negative input and V− at its positive input. A second differential amplifier 208 receives V− at its negative terminal and V+ at its positive terminal. The output of the first differential amplifier 206 is coupled to a negative terminal of a third differential amplifier 210 and the output of the second differential amplifier 208 is coupled to a positive input of the third differential amplifier 210. A fourth differential amplifier 212 is configured as a voltage follower buffer to increase the current of a comparator switching signal (Out+, Out−) from the third differential amplifier 210.

Figure 16:
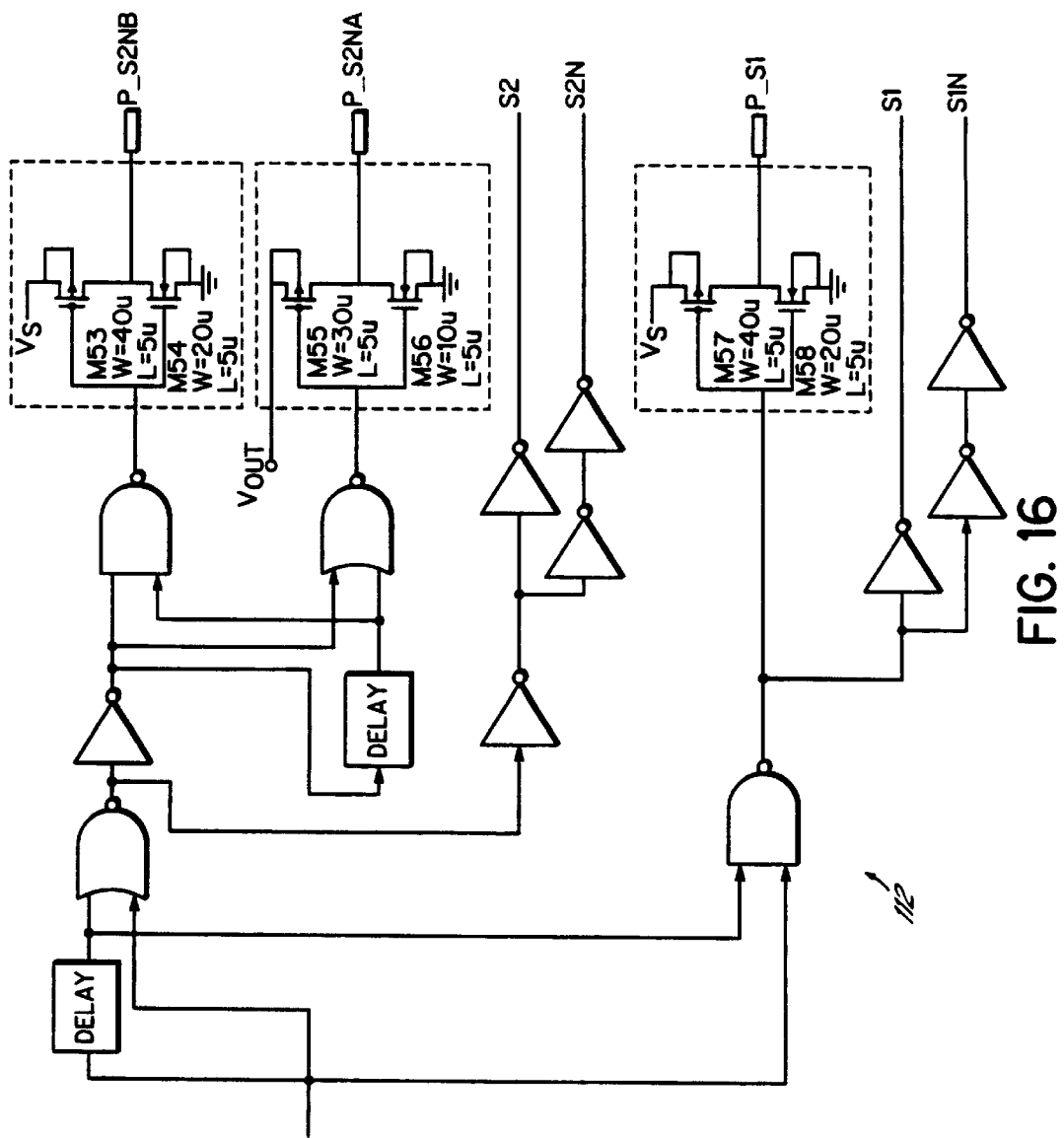
FIG. 16 is an embodiment of a timing controller circuit for the power controller of FIG. 12.

Referring to FIG. 16, one embodiment of a timing controller circuit 112 is depicted for the power controller 46A of FIG. 7. Basically, the timing controller circuit 112 is responsible for performing the necessary individual switch commands to reconfigure the power output stage 44A between charge and discharge phases. In addition, the timing controller circuit 112 for the power controller 46A must correctly phase paired switches and sequenced switches to avoid certain switch combinations. For example, neither of the charge phase power switches M1 and M3 should be closed at the same time as either of the discharge phase power switches M2 and M4. Otherwise, a cross conduction (or transconductance) occurs wherein, for example, the energy source 12 is momentary shorted to the output terminal 42, as discussed above.

Figure 17:
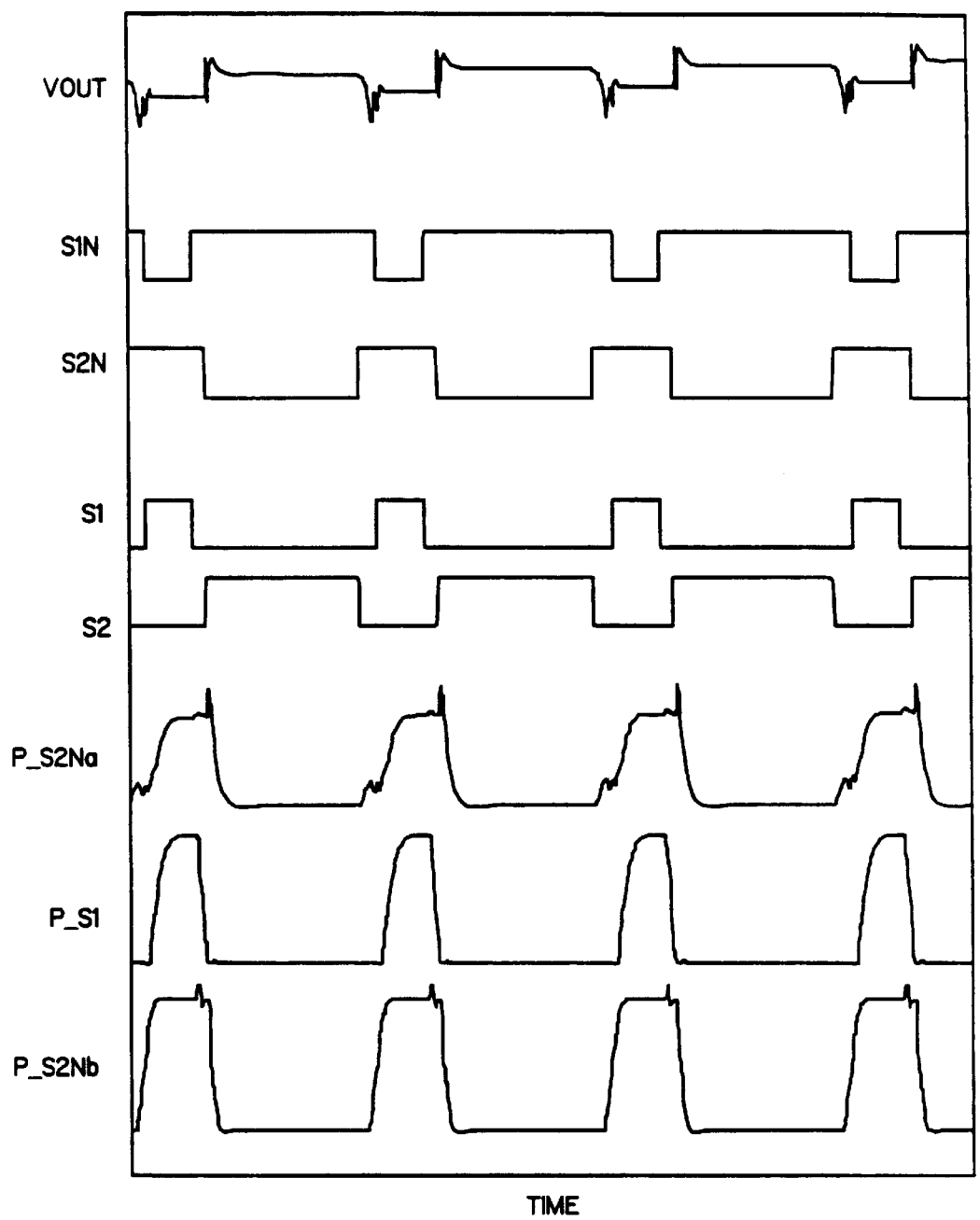
FIG. 17 is an illustrative timing diagram for the timing control circuit of FIG. 16.

Referring to FIG. 17, a timing diagram for the timing controller circuit 112 is depicted. Specifically, the S1 signal is the charge phase signal used internally by the dynamic controller 50. The S2 signal is the discharge phase signal used internally by the dynamic controller 50. The P_S2Nb signal is a higher current switch signal for a p-type MOSFET M2, delayed with respect to the S2 signal to prevent cross conduction, as well as inverted from S2 due to p-type MOSFET M2 opened by a positive voltage. The P_S2Na is a high power switch signal for a p-type MOSFET M4, delayed with respect to the P_S2Nb. The P_S1 signal is a higher current version of S1 for the power MOSFET switches M1, M3. The S2N signal is an inverted version of the S2 signal for the start-up circuit 116, specifically switch M14. The S1N signal is an inverted version of S1 for the start-up circuit 116, specifically switch M15.

While the present invention has been illustrated by description of several embodiments and while the illustrative embodiments have been described in considerable detail, it is not the intention of applicants to restrict or in any way limit the scope of the appended claims to such detail. Additional advantages and modifications readily appear to those skilled in the art.

For example, although dynamically controlling a noninverting charge pump power output stage 44A has been discussed. Having the benefit of the instant disclosure, it would be apparent to those skilled in the art that it would be consistent with the invention to dynamically control an inverting charge pump power output stage.

A power converter 40A consistent with the invention may be incorporated in a wide range of products. For example, a power converter 40A taking advantage of the small size achievable with integrated circuits and low power consumption properties described above may advantageously be incorporated into a battery package to enhance battery service life and energy and amplitude on demand.

Moreover, a power converter 40A consistent with the invention, whether incorporated inside an energy source 12 or in a load device 14 utilizing an energy source 12, would improve or enable a wide range of portable electronic devices 10. For example, the reduction in size and weight of an energy source 12 would allow less intrusive medical diagnostic, energy-delivery, or actuated medicine delivery devices, whether worn or implanted.

In addition, portable electronic currently powered by batteries or similar energy sources 12 may be improved by incorporating the power converter in accordance with the invention. In portable communication devices and portable audio devices, for instance, improved service life may be obtained through the increased efficiency, and performance may be enhanced by lowering the power converter 40A operating frequency, and thus the noise, when allowed to do so by a decreased demand.

Also, a largely or fully integrated power converter 40A consistent with the invention would provide a sufficiently small efficient power supply for memories, logic circuits and other integrated devices. For example, the power converter 40A may be embedded into a portion of an integrated circuit also containing a memory, logic circuit or other integrated device.

Furthermore, the aspects of the invention related to dynamically adapting to the input voltage, especially with regard to a low input voltage, allow for applications wherein the input voltage is volatile or otherwise unsuitable for generally known power converters. For example, photovoltaic cells provide power in relation to the surface area and the amount of incident radiant energy. Consequently, devices using photovoltaic cells may often be inoperable due to insufficient light, may have to limit functionality to remain within the typical amount of available power, and/or have to increase the surface area devoted to photovoltaic cells. Thus, a power converter 40A may allow for smaller photovoltaic cells and use in a wider range of lighting conditions.

As another example, a multi-output power converter 40A consistent with the invention may include a plurality of power converters configured for various output voltage levels and energy transfer capacities. Alternatively, a single power controller 46A may control a plurality of power output stages 44A. Such combinations may further include features such as staged power-down wherein certain outputs remain powered while others are disconnected depending on parameters such as an output signal command $S_C$ or sensed impending energy source 12 depletion. Thus, a portable electronic device 10 may have various portions that require different voltage levels. Certain battery saving modes may be commanded by a microprocessor or the power converter 40A itself may sense impending battery failure. Thus, certain outputs could be shutdown to conserve power while more important functions are maintained, such as supporting volatile memory functions.

As an additional further example, a single fly capacitor $C_F$ and load capacitor $C_L$ has been illustrated for clarity. It should be appreciated by those skilled in the art that power converters 40A consistent with the invention may include a plurality of fly capacitors $C_F$ and/or a plurality of load capacitors $C_L$. Moreover, the fly capacitor $C_F$ and/or load capacitor $C_L$ may comprise various storage devices for electrical and magnetic energy.

As another example, a power converter 40A consistent with the invention may be incorporated in a wide range of products. For example, a power converter 40A taking advantage of the small size and low power consumption (i.e., efficiency) properties described above may advantageously be incorporated into a battery package to enhance battery service life and energy and amplitude on demand. Incorporating the power converter 40A would be accomplished in manner similar to that disclosed in the following co-pending and commonly owned applications all filed on Apr. 2, 1998: U.S. Ser. No. 09/054,192, entitled PRIMARY BATTERY HAVING A BUILT-IN CONTROLLER TO EXTEND BATTERY RUN TIME, naming Vladimir Gartstein and Dragan D. Nebrigic; U.S. Ser. No. 09/054,191, entitled BATTERY HAVING A BUILT-IN CONTROLLER TO EXTEND BATTERY SERVICE RUN TIME naming Vladimir Gartstein and Dragan D. Nebrigic; U.S. Ser. No. 09/054,087, ENTITLED BATTERY HAVING A BUILT-IN CONTROLLER, naming Vladimir Gartstein and Dragan D. Nebrigic; and U. S. Provisional Application Serial No. 60/080,427, entitled BATTERY HAVING A BUILT-IN CONTROLLER TO EXTEND BATTERY SERVICE RUN TIME, naming Dragan D. Nebrigic Milan M. Jevtitch, Vig Sherrill, Nick Busko, Peter Hansen, and William Millam. All of the aforementioned applications are hereby incorporated by reference in their entirety.

Power Converter Based on Flying Ultra-Capacitor

In one version consistent with the present invention, an ultra-capacitor is advantageously used as the fly capacitor $C^U_F$, or "flying ultra-capacitor". An ultra-capacitor includes electrochemical double layer capacitors that store energy electrostatically by polarizing an electrolytic solution. There is no chemical reaction involved in the energy storage physics of an ultra-capacitor. Consequently, the energy storage mechanism of ultra-capacitors is extremely bi-directional (i.e., recoverable), allowing an ultra-capacitor to be charged and discharged thousands of times. It should be appreciated that ultra-capacitors somewhat may electrically resemble a secondary battery, but have a capability for a larger number of charging and discharging cycles.

Ultra-capacitors also have several orders of magnitude higher capacitance than traditional capacitors used in integrated circuits (e.g., tantalum capacitors). Capacitors in general store energy in the form of separated electrical charge such as on separated plates. The stored energy is proportional to the physical area of charge storing plates and inversely proportional to the distance between the plates of the capacitor. With regard to ultra-capacitors, a porous structure acting as the "plate" allows for a large surface area per weight (e.g., 2000 m²/gm). Also, the charge separation distance in ultra-capacitors is determined by the size of the ions in the electrolyte that are attracted by the charged electrode. The typical charge separation is as small as 10 Angstroms. The combination of large surface area and minute charge separation distance enables the large capacitance of ultra-capacitors.

Examples of commercially available ultra-capacitors (a.k.a., super or pseudo capacitors) are the PC-5, PC-5-5, and PC10 available from Maxwell® Technologies, San Diego, Calif. For the PC-5, the nominal capacitance is 4 F, the ESR is 0.18–0.33 Ohms, the leakage resistance (R1) is 10 MOhms, and maximum voltage is 2.7 V. For the PC-5-5, the nominal capacitance is 1.8 F, the ESR is 0.39–0.66 Ohms, the leakage resistance (R1) is 10 MOhms, and maximum voltage is 5.4 V. The large storage capacities of ultra-capacitors such as the PC5-5 (operated at 1 to 5.4 VDC) is illustrated by its ability to output 0.5 W for 60 seconds and 3 W for about 10 seconds. Use of a flying ultra-capacitor $C^U_F$ in a charge pump based power converter in accordance with the aspects of the invention provides benefits to a number of power supply applications, as will become more apparent in the illustrative embodiment described below.

As an example, it is known to "ballast" a battery by using an ultra-capacitor in parallel so that short duration pulses do not adversely affect the battery service life and produce voltage droop from the battery during peak demands. Using an ultra-capacitor as the flying capacitor in accordance with the principles of the invention provides an opportunity to improve power supply operation accordingly. However, devices that have requirements for moderate amounts of power (e.g., 1–5 W), as well as battery protection from short duration pulses, generally suffer from the limitations of the battery, such as discussed above. In particular, a significant amount of stored energy in the battery may be unrecoverable as the output voltage of the battery decreases during its service life. Use of an ultra-capacitor in a "ballast" capacity does not significantly contribute to recovering this stored energy.

Furthermore, it is known to resort to DC/DC converters that utilize an inductive element in order to obtain the desired voltage levels, especially for applications requiring moderate power levels (e.g., 0.5–5 W) that are unsuitable for conventional charge pump based power converters. The operating frequency of these DC/DC converters in combination with the typically noisy inductive element result in electromagnetic interference (EMI) problems.

Still further, an unfulfilled need exists for a power supply that meets the needs described above as well as being suitable for monolithic, integrated fabrication within a low profile package at an economic cost. Generally known power supplies require integrating a number of large discrete components together, thus aggravating volume limitations and increasing the manufacturing complexity of the power supply.

Figure 18:
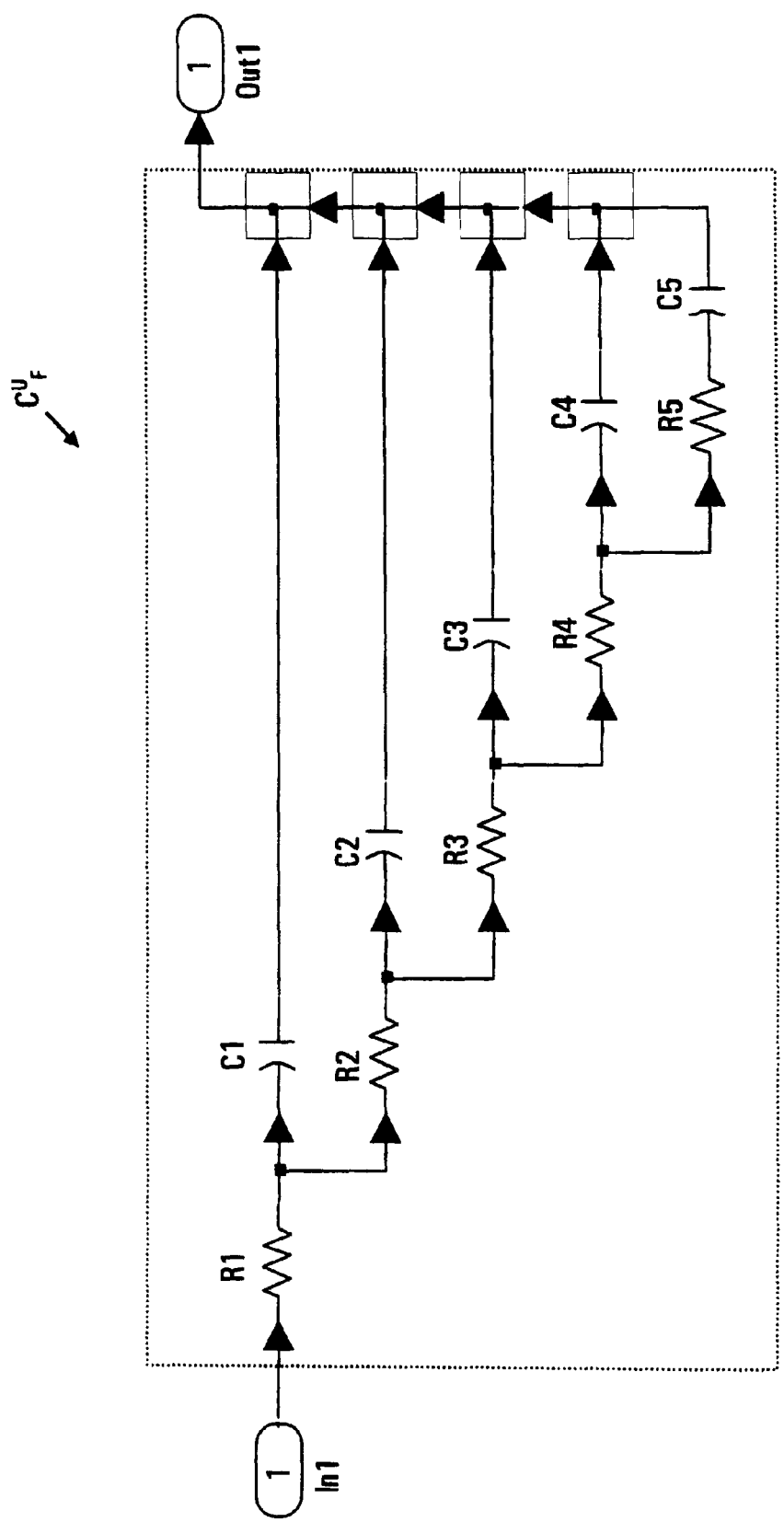
FIG. 18 is an equivalent circuit representation of an ultra-capacitor.

Referring to FIG. 18, ultra-capacitors have electrical characteristics that differ from conventional capacitors, as depicted in the illustrated equivalent lumped parameter network circuit representation for an ultra-capacitor. In particular, the ultra-capacitor responds as a resistor R1 in series with a capacitor C1, wherein the capacitor C1 has coupled across its terminals another series combination of a resistor R2 and a capacitor C2. With capacitor C2 similarly configured with another resistor R3 and capacitor C3 across its terminals. Series combination of resistor R4 and capacitor C4 are across the terminals of capacitor C3 and series combination of resistor R5 and capacitor C5 are across the terminals of capacitor C4. Referring to FIG. 18, the capacitive components C1–C5 are reflections of the energy stored within the ultra-capacitor and the resistive components R1–R5 comprise the equivalent series resistance (ESR) of the ultra-capacitor.

Ultra-capacitors have not been incorporated for applications such as charge pumps due to their relatively large series resistance, as shown in the depicted circuit representation. However, it has been determined that the ultra-capacitor has an ESR that decreases with increasing frequency, although the capacitance value also decreases with increasing frequency in change of current. Consequently, a trade-off exists were a suitable charge and discharge rate yields efficient energy transfer when an ultra-capacitor is used as a flying capacitor in a charge pump. Thus, the capacitance value of an ultra-capacitor is still several magnitudes larger than comparable conventional capacitors at operating frequencies that result in a moderate ESR.

Determining the optimum operating frequency and choice of ultra-capacitor is found by evaluating the following equation that characterizes the ultra-capacitor:

$$dV = i*(dt/C) + i*R$$

where i is current, C is the nominal capacitance, dV is the change in voltage, dt is the change in time, R is the equivalent series resistance.

These electrical characteristics of an ultra-capacitor impose a number of considerations for selecting and controlling an appropriate ultra-capacitor. First, a determination is made of the maximum voltage in the power converter to meet load demand. Secondly, a determination is made of the minimum voltage allowed in the power converter to meet load demand. Thirdly, a determination is made of the maximum allowable voltage change and voltage ripple in the power converter (i.e., dV). Based on the criteria above, the maximum load and discharge profile for the ultra-capacitor (constant current or constant power for I is identified). Also, based on the criteria above, the temperature operating condition that the ultra-capacitor must tolerate is determined. Still further, based on the above criteria, the duration of any output pulse from the ultra-capacitor that can be allowed in relation to the suitable minimum operating frequency and EMI/noise margin (i.e., dt) is determined. Using the output pulse duration, the repetition rate or range of potential charging and discharging rates that can be expected during the complete set of device operating conditions is determined. Then, based on the charging/discharging rates, the required power converter service life (i.e., number of charge/ discharge cycles to be tolerated by the ultra-capacitor) is determined. The nominal capacitance C is determined based on available ultra-capacitors and the nominal operating frequency, as is the ESR value of R.

Selecting or designing a suitable ultra-capacitor based on these criteria is described in the following co-pending and commonly owned application which was filed on Nov. 22, 1999 by Dragan D. Nebrigic, et. al.: U.S. Ser. No. 60/166, 823 entitled "ACTIVE PACKAGE FOR INTEGRATED CIRCUIT" and which is hereby incorporated by reference herein in its entirety.

Figure 19:
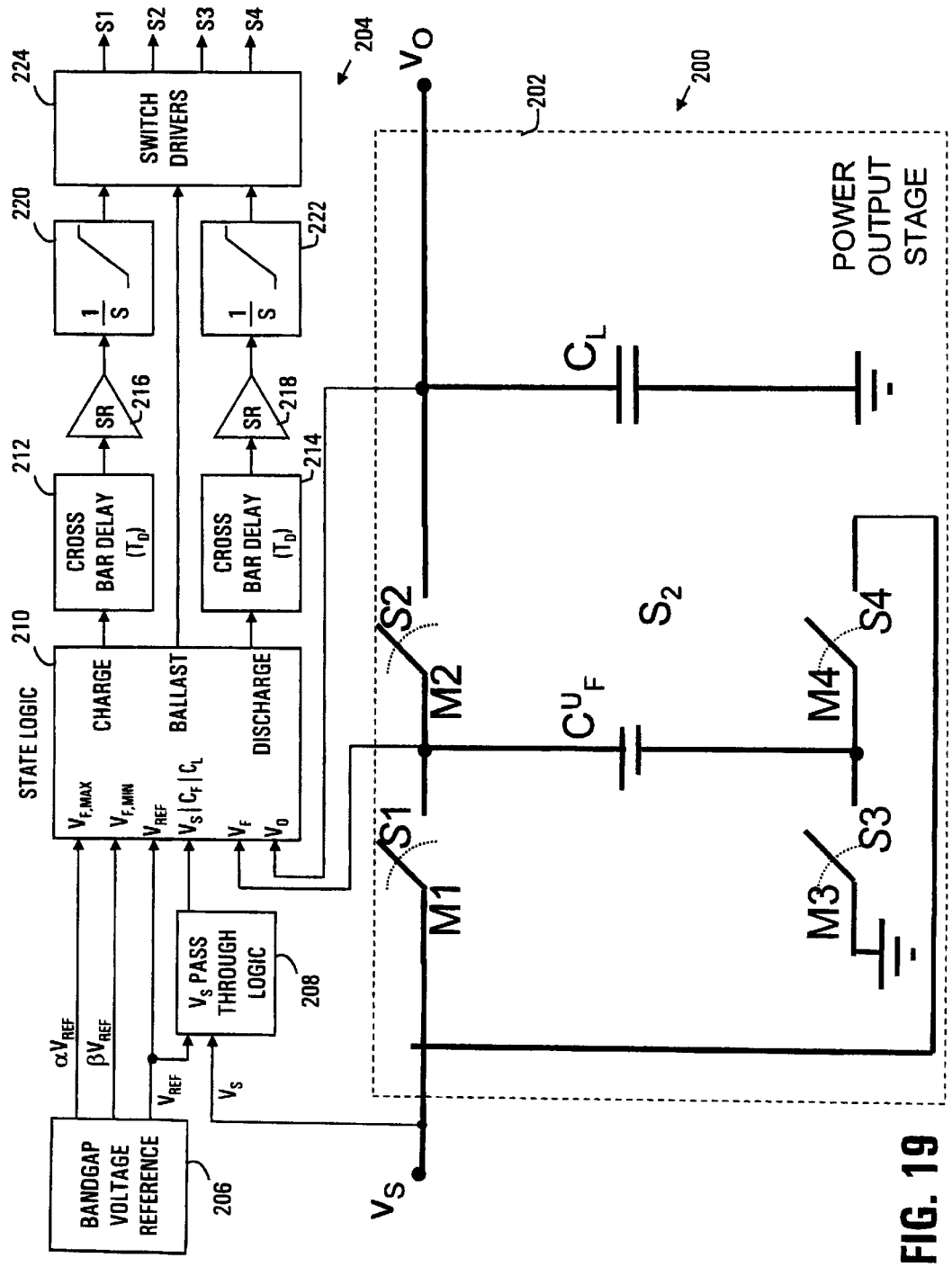
FIG. 19 is an embodiment of a circuit for a dynamically controlled, intrinsically regulated power converter based on a charge pump including a flying ultra-capacitor.

Referring to FIG. 19, an embodiment of a circuit is depicted for a dynamically controlled, intrinsically regulated power converter 200 based on a charge pump power output stage 202 including a flying ultra-capacitor $C^U_F$. The power output stage 202 is similar to the descriptions above, with particular exception of the fly capacitor $C_F$, which has been substituted with a flying ultra-capacitor $C^U_F$. It should be appreciated that the load capacitor ($C_L$) may advantageously be an ultra-capacitor as well in certain applications. Generally available ultra-capacitors, however, are limited to about 5 V maximum. Consequently, other types of capacitors (e.g., tantalum) may be used in applications requiring higher output voltages (e.g., 7 V).

The power output stage 202 (a.k.a. voltage doubler) depicted in FIG. 19 is for illustrative purposes. It should be appreciated that various charge pump configurations (e.g., inverting, noninverting, step-down) consistent with the present invention may advantageously incorporate one or more flying ultra-capacitors $C^U_F$.

An ultra-capacitor dynamic controller 204 for switching the output stage 202 differs from the dynamic controller 46 described above for embodiments using conventional capacitors. The slow cycling of the power output stage 202 between charge and discharge states allows for a simplified control scheme. For instance, timing in one sense is less critical in that the control logic need not operate in the same radio frequency (RF) operating frequencies. Instead, the controller 204 typically operates at about 1 kHz at peak power demand down to an essentially static condition for long periods during low demand conditions. Instead of accommodating rapid switching, the controller 204 is directed to controlling voltage ripple in both the charging of the flying ultra-capacitor $C^U_F$ and the output voltage $V_O$ (i.e., discharging of the flying ultra-capacitor $C^U_F$ into the load capacitor $C_L$). In addition, the controller 204 maintains a rate of voltage change (slew rate) of switching of the switches (M1–M4) with switch signals (S1–S4). Thus, the efficiency of the flying ultra-capacitor $C^U_F$ is increased by avoiding rapid changes in current through the flying ultra-capacitor $C^U_F$.

The controller 204 utilizes a bandgap voltage reference 206 to provide a reference voltage $V_{REF}$, from which scaled voltage references are produced for the various thresholds on voltage ripple. A bandgap voltage reference 206 is suitable rather than a more complex Proportional to Absolute Temperature (PTAT) element due to the modest operating frequency. A PTAT element generally comprises two summed elements having complementary temperature coefficients, one positive and one negative, so that they offset one another with changes in temperature.

The controller 204 may advantageously include a source voltage $V_S$ pass-through logic circuit 208 that allows the power converter 200 to collapse into ballast configuration when the source voltage $V_S$ is within a predetermined acceptable output voltage $V_O$ range. Thus, the source voltage $V_S$, flying ultra-capacitor $C^U_F$, and load capacitor $C_L$ are all placed in parallel such as by closing switches M1, M2 and M3 and opening switch M4 of the power output stage 202.

The pass-through logic circuit 208 may alternatively or additionally provide a configuration for extremely light loads wherein the load capacitor $C_L$, especially a load capacitor that is an ultra-capacitor, provides the output voltage $V_O$ with the flying ultra-capacitor $C^U_F$ and voltage source $V_S$ uncoupled from the output terminals. Moreover, portions of the controller 204 may be deactivated during this period to increase efficiency. Thus, the energy losses due to the equivalent series resistance of a battery as the energy source is avoided. Long periods of ultra-low power demand are typical for devices such as integrated circuit memories. Maintaining stored data requires low levels of power, as compared to infrequent periods where rapid reading and writing of the memory results in increases in power demands.

The state logic 210 determines that a state change between charge and discharge or between discharge and charge is required. In particular, the state logic 210 provides the two-state, closed-loop control to maintain the voltage ripple across the flying ultra-capacitor $C^U_F$ and the load capacitor $C_L$, an example for the control logic being described below with respect to FIG. 20. The state logic 210 receives reference voltages for use in threshold comparisons with the fly capacitor voltage $V_F$ and output voltage $V_O$, such as a scaled reference voltage $\alpha V_{REF}$ for a maximum fly capacitor voltage $V_{F,MAX}$; $\beta V_{REF}$ for a minimum fly capacitor voltage $V_{F,MAX}$; and a voltage reference $V_{F,MAX}$ for comparing to the output voltage $V_O$.

Once the state logic 210 has initiated a state change, the charge or discharge signal is processed to avoid shorting of the capacitors $C^U_F$, $C_L$ during the state change and to provide an efficient rate of current change from or to the flying ultra-capacitor $C^U_F$. Consequently, the charge and discharge signals each go through a cross bar delay ($T_d$) 212, 214 to ensure that a short circuit condition does not exist during the transition. The minimum cross bar delay is related to the slew rate (SR) used in switching the MOSFET switches (M1–M4) (i.e., the change in volts per second from the minimum to the maximum output voltage).

One way of achieving an efficient slew rate of switching the MOSFET switches (M1–M4) is to pass the delayed command signal from the cross bar delay 212, 214 through an amplifier 216, 218 having a gain related to the desired slew rate. The amplified and delayed command then passes through an integrator 220,222, as depicted by the Laplacian function "1/s", wherein each integrator 220, 222 has upper and lower saturation limits corresponding to a fully open and fully closed switch command. Depending on the type of switches used and the operating voltages, switch drivers 224 may be required to level shift and/or provide necessary current levels to affect the switching.

A start-up circuit may not be necessary, especially if the source voltage $V_S$ is above 0.8 V, as may be typical for higher power requirements satisfied by an ultra-capacitor based power converter 200. Moreover, a desirable feature of ultra-capacitors is their inherent tendency to recover, like electrochemical batteries, in a no-load condition, thus providing increased voltage for start-up and avoiding latch to ground problems with the switches (M1–M4).

Ultra-capacitors may advantageously be incorporated into an integrated circuit as described in the above referenced U.S. application Ser. No. 60/166,823. Consequently, ultra-capacitor-based power converters 200 consistent with the invention may be fabricated as a monolithic integrated circuit component, with the inherent advantages in small size and reduced fabrication and assembly complexity.

Figure 20:
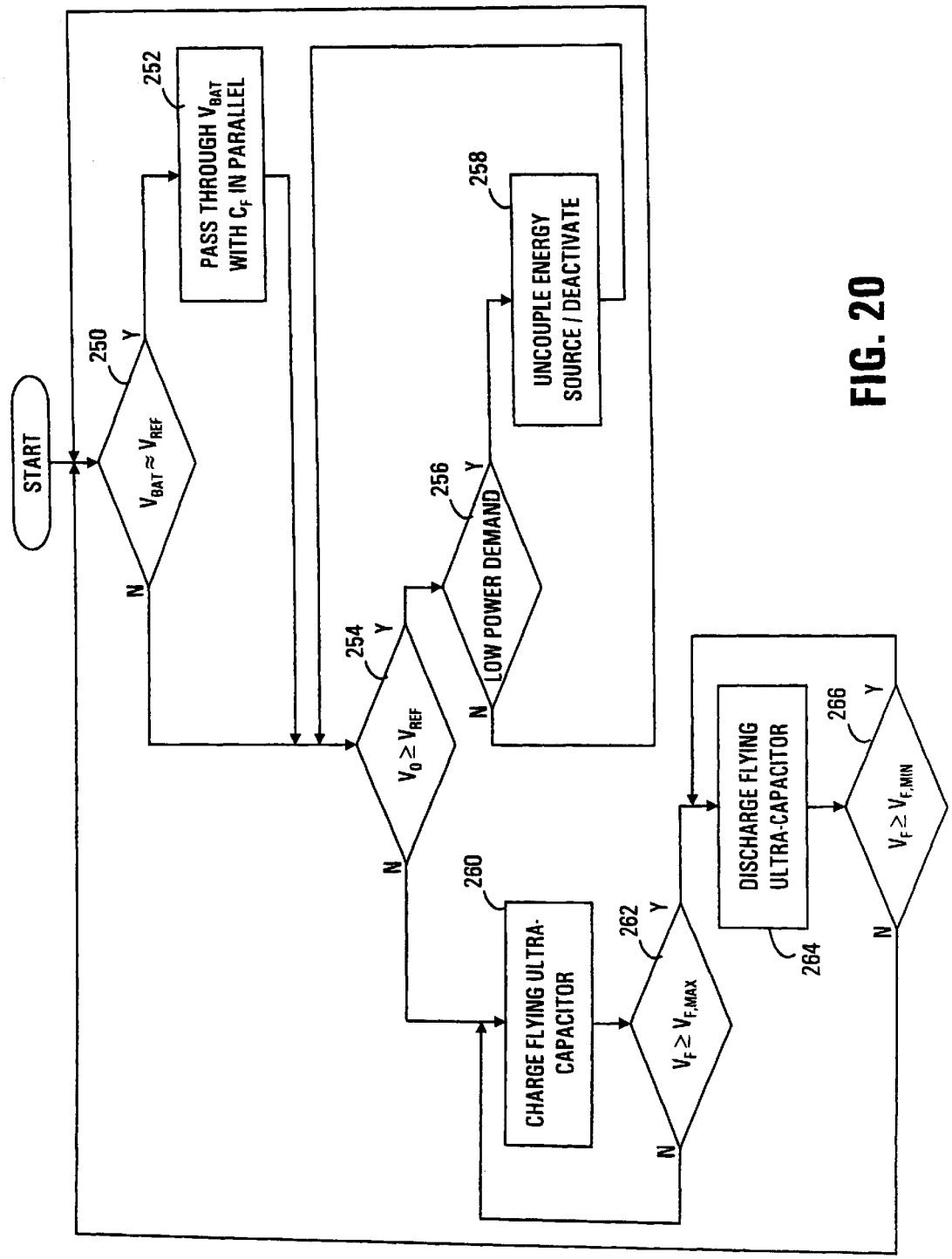
FIG. 20 is a flow diagram for the state control of the power converter of FIG. 19.

Referring to FIG. 20, a method of determining the need to change between the two-states is depicted (state logic), controlling the voltage ripple across the flying ultra-capacitor $C^U_F$, as well as providing additional pass through features.

In some applications, the energy source may provide adequate output voltage in certain situations. Consequently, a determination is made in block 250 as to whether the energy source voltage (e.g., battery voltage $V_{BAT}$) is within an acceptable range for the desired output voltage $V_O$, such as when the battery voltage is approximately equal to the reference voltage $V_{REF}$. If so, then the energy source may be coupled directly to the output, such as by passing through the battery voltage $V_{BAT}$ to the output terminals while coupling the flying ultra-capacitor $C^U_F$ in parallel to both the energy source and the load capacitor $C_L$ to act as ballast to compensate for short duration pulse demands (block 252).

After either blocks 250 or 252, a determination is made as to whether the load capacitor $C_L$ has sufficient voltage (i.e., $V_O \geq V_{REF}$) (block 254).

If the load capacitor $C_L$ is sufficiently charged, a further determination may be advantageously performed as to whether a low power demand condition exists (block 256). If so, further efficiencies may be achieved by uncoupling the energy source and/or deactivating portions of the power converter 200, allowing the load capacitor $C_L$ to supply the power (block 258). Afterward, processing returns to block 254 to continue monitoring whether the output voltage $V_O$ remains above the reference voltage $V_{REF}$.

If in block 254 the output voltage $V_O$ is below the reference voltage $V_{REF}$, then a charge/discharge cycle is warranted. Consequently, the flying ultra-capacitor $C^U_F$ is switched into a charge state (block 260). Then, the voltage $V_F$ across the flying ultra-capacitor $C^U_F$ is monitored to determine whether it has reached a predetermined maximum fly capacitor voltage $V_{F,MAX}$ (block 262). Once the flying ultra-capacitor $C^U_F$ has reached this maximum, then the flying ultra-capacitor $C^U_F$ is switched to a discharge state (block 264). The flying ultra-capacitor $C^U_F$ is charged until a determination is made in block 266 that the voltage across the flying ultra-capacitor $C^U_F$ has fallen below a minimum fly capacitor voltage $V_{F,MIN}$. When this bottom level of the fly capacitor voltage ripple band has been reached, then processing returns to the beginning at block 250 for continued monitoring of the ripple bands and power demands.

It should be appreciated that the above-described ultra-capacitor based power converter 200 advantageously has applications in a wide array of devices, including those requiring efficient operation between periods of low demand and high demand. By contrast, conventional DC/DC power converters tend to be efficient only within a narrow range of power output levels. Due to the ability to fabricate a small volume integrated circuit with reduced EM1 emissions as compared to conventional DC/DC power converters, ultra-capacitor based power converters 200 may advantageously be used in portable telecommunication devices.

In particular, cellular telephones are enhanced by using a power converter 200 consistent with the present invention since battery service life is increased, peak power demands are satisfied, and reduced packaging size is accommodated. It will be appreciated that a broad range of portable devices are similarly enhanced or enabled.

What is claimed is:

1. A power converter comprising:
    a power output stage including a load capacitor and a fly capacitor, the fly capacitor comprising an ultra-capacitor, the power output stage configured to receive an input voltage from an energy source and to provide an output voltage across output terminals, the load capacitor being electrically coupled across the output terminals, the power output stage further configured to switch between a charge state and discharge state, wherein the charge state includes the fly capacitor being electrically in parallel to the input voltage and wherein the discharge state includes the fly capacitor being electrically coupled across the load capacitor; and,
    a clockless dynamic controller operably coupled to the power output stage and adapted to respond to the output voltage across the load capacitor and to a predetermined reference voltage to command the switching from the charge state to the discharge state wherein the clockless dynamic controller commands switching between charge and discharge states at a predetermined slew rate.

2. The power converter of claim 1, wherein the dynamic controller is further adapted to respond to the input voltage and to a fly capacitor voltage across the fly capacitor to command the switching from the discharge state to the charge state.

3. The power converter of claim 2, wherein the dynamic controller is further adapted to switch the fly capacitor between the charge state and the discharge state with an intervening delay for mitigating transconductance, wherein the intervening delay corresponds to the slew rate of switching.

4. The power converter of claim 1, wherein during the discharge state, the energy source is electrically coupled in series with the fly capacitor so that the series combination of the energy source and the fly capacitor is electrically coupled across the load capacitor.

5. The power converter of claim 4 for stepping up the output voltage with respect to the input voltage, wherein the charge pump power output stage includes:
    a first switch M1 closingly responsive to a first switch signal S1 from the dynamic controller for electrically coupling the first input voltage to a first terminal of the fly capacitor;
    a second switch M2 closingly responsive to a second switch signal S2 from the dynamic controller for electrically coupling the first terminal of the fly capacitor to a first terminal of the load capacitor;
    a third switch M3 closingly responsive to the first switch signal S1 from the dynamic controller for electrically coupling a ground of the energy source to a second terminal of the fly capacitor; and
    a fourth switch M4 closingly responsive to the second switch signal S2 from the dynamic controller for electrically coupling the second terminal of the fly capacitor to the energy source.

6. The power converter of claim 1, wherein the discharge state selectably comprises a step-up discharge state and a step-down discharge state, wherein the power output stage is further configured to switch between the step-up discharge state comprising the fly capacitor electrically coupled across the load capacitor and the step-down discharge state comprising a series combination of the energy source and the fly capacitor electrically coupled across the load capacitor, wherein the dynamic controller is further responsive to the input voltage being greater than the reference voltage for selecting the step-up discharge step and else selecting the step-down discharge state.

7. The power converter of claim 6, wherein the power output stage includes:
    a first switch M1 closingly responsive to a first switch signal S1 from the dynamic controller for electrically coupling the first input voltage to a first terminal of the fly capacitor;
    a second switch M2 closingly responsive to a second switch signal S2 from the dynamic controller for electrically coupling the first terminal of the fly capacitor to a first terminal of the load capacitor;
    a third switch M3 electrically coupling a ground of the energy source to a second terminal of the fly capacitor in response to one of the step-down discharge state and a charge state; and
    a fourth switch M4 electrically coupling the second terminal of the fly capacitor to the energy source in response to the step-up discharge state.

8. The power converter of claim 1, wherein the dynamic controller is further adapted to respond to the input voltage being approximately equal to the reference voltage to couple the input voltage to the output terminals and to ballast the energy source with the fly capacitor.

9. The power converter of claim 1, wherein the dynamic controller is further adapted to respond to the output voltage being above the reference voltage to uncouple the energy source from the output terminals for allowing the load capacitor to provide the output voltage.

10. The power converter of claim 1, wherein the power output stage includes low on-resistance FET switches.

11. The power converter of claim 10, wherein the low on-resistance FET array switches comprise lightly doped MOSFET arrays for sub-one volt input voltage operation.

12. The power converter of claim 1 for stepping down the output voltage with respect to the input voltage, wherein the power output stage includes:
    a first switch M1 closingly responsive to a first switch signal S1 from the dynamic controller for electrically coupling the first input voltage to a first terminal of the fly capacitor;
    a second switch M2 closingly responsive to a second switch signal S2 from the dynamic controller for electrically coupling the first terminal of the fly capacitor to a first terminal of the load capacitor; and
    a ground path electrically coupled to the energy source, the second terminal of the fly capacitor, and the second terminal of the load capacitor.

13. An electronic device including an energy source, a load device, and the power converter of claim 1, the power converter interposed between the energy source and the load device.

14. The electronic device of claim 13, wherein the electronic device comprises one of a portable communication device, a portable medical device and a portable audio device.

* * * * *